(12) United States Patent
Rudduck

(10) Patent No.: US 7,217,059 B1
(45) Date of Patent: May 15, 2007

(54) FIXING AND RELEASE SYSTEMS

(75) Inventor: Dickory Rudduck, Seaforth (AU)

(73) Assignee: Telezygology Pty Limited, Sydney (AU)

( * ) Notice: Subject to any disclaimer, the term of this patent is extended or adjusted under 35 U.S.C. 154(b) by 0 days.

(21) Appl. No.: 09/646,741

(22) PCT Filed: Mar. 18, 1999

(86) PCT No.: PCT/AU99/00185

§ 371 (c)(1),
(2), (4) Date: Sep. 18, 2000

(87) PCT Pub. No.: WO99/47819

PCT Pub. Date: Sep. 23, 1999

(30) Foreign Application Priority Data

Mar. 18, 1998 (AU) .................................. PP2477

(51) Int. Cl.
*F16B 21/12* (2006.01)
(52) U.S. Cl. .................. 403/324; 403/277; 403/322.3; 403/DIG. 1
(58) Field of Classification Search ................ 403/324, 403/209, 251, 275, 277, 290, 322.3, 316, 403/DIG. 1, 188, 204; 24/303, 453
See application file for complete search history.

(56) References Cited

U.S. PATENT DOCUMENTS

| | | | |
|---|---|---|---|
| 3,134,404 A | 5/1964 | Ziccardi | |
| 3,214,832 A | 11/1965 | Schwinghamer | |
| 3,395,555 A | 8/1968 | Hickman | |
| 3,596,958 A | 8/1971 | Bowerman | |
| 3,745,736 A | 7/1973 | Fischer et al. | |

(Continued)

FOREIGN PATENT DOCUMENTS

AU 44961/59 A 7/1959

(Continued)

OTHER PUBLICATIONS

"Simple Network—The Lin Bus" http://www.microchip.com/1010/edit/proceed/archive9_311/index.htm, Jan. 13, 2003.

(Continued)

*Primary Examiner*—Kenneth Thompson
(74) *Attorney, Agent, or Firm*—Wilmer Cutler Pickering Hale and Dorr

(57) ABSTRACT

A connecting means adapted to fix or release a first element (4) and a second element (5) includes a locking pin (1) which is moveable to remote activation means between a locked position. In which leg (8) expends wall (9) into recess (10), and an unlocked position. The remote activation means may be magnetic, electro-magnetic or any other suitable means. A method of fixing or releasing first and second elements by remote activation means is also disclosed. The invention further provides a first element having first means (166) adapted to cooperate with second means (165) on a second element to facilitate connection of the first and second elements. A method of manufacturing the first element includes the steps of depositing discrete amounts of setable material on a surface of the first element and inverting the element to permit the material to set under the influence of gravity. A method of reducing the spacing between first and second elements by remote activation means is also disclosed.

36 Claims, 25 Drawing Sheets

U.S. PATENT DOCUMENTS

| | | | |
|---|---|---|---|
| 3,855,827 A | 12/1974 | Hallman et al. ............... 70/134 |
| 3,911,534 A | 10/1975 | Martens et al. ............... 24/150 |
| 3,947,930 A | 4/1976 | Martens et al. ......... 24/155 BR |
| 3,962,910 A | 6/1976 | Spyridakis et al. |
| 3,974,669 A | 8/1976 | Stackhouse |
| 4,006,567 A | 2/1977 | Flannery |
| 4,012,813 A | 3/1977 | Martens et al. ........... 24/150 R |
| 4,016,914 A | 4/1977 | Zurko ..................... 151/41.76 |
| 4,195,868 A | 4/1980 | Kalen et al. ........... 292/256.67 |
| 4,223,799 A | 9/1980 | Eyster et al. ............... 220/230 |
| 4,339,853 A | 7/1982 | Lipschitz ............... 24/155 BR |
| 4,382,711 A | 5/1983 | Lafosse et al. ............. 403/290 |
| 4,425,117 A | 1/1984 | Hugemann et al. |
| 4,451,449 A | 5/1984 | Goring ...................... 89/1.806 |
| 4,453,449 A | 6/1984 | Hollmann |
| 4,507,115 A | 3/1985 | Kambara et al. |
| 4,515,045 A | 5/1985 | Gnatchenko et al. |
| 4,518,285 A | 5/1985 | Weber et al. |
| 4,523,356 A | 6/1985 | Charlot, Jr. ............. 24/155 BR |
| 4,539,929 A | 9/1985 | Sestak et al. |
| 4,602,908 A | 7/1986 | Kroeber |
| 4,620,428 A | 11/1986 | Kopesky ...................... 70/175 |
| 4,624,443 A | 11/1986 | Eidsmore ..................... 251/65 |
| 4,651,136 A | 3/1987 | Anderson et al. ........... 340/572 |
| 4,705,070 A | 11/1987 | Eidsmore ............... 137/614.21 |
| 4,728,217 A * | 3/1988 | Fink ........................... 403/290 |
| 4,767,337 A * | 8/1988 | Kawasaki et al. ..... 403/DIG. 1 |
| 4,806,815 A | 2/1989 | Honma et al. |
| 4,841,100 A | 6/1989 | Ignasiak |
| 4,845,998 A | 7/1989 | DeMartelaere et al. |
| 4,919,464 A | 4/1990 | Richards |
| 4,926,699 A | 5/1990 | Salce, Sr. |
| 4,934,885 A * | 6/1990 | Woods et al. ................. 24/453 |
| 4,960,760 A * | 10/1990 | Wang et al. ................. 505/164 |
| 5,014,794 A | 5/1991 | Hansson |
| 5,061,112 A | 10/1991 | Monford, Jr. ............... 403/328 |
| 5,076,623 A | 12/1991 | Richards |
| 5,077,872 A | 1/1992 | Guthammar ............... 24/704.1 |
| 5,120,175 A | 6/1992 | Arbegast et al. |
| 5,145,227 A | 9/1992 | Monford, Jr. ............. 294/65.5 |
| 5,160,233 A | 11/1992 | McKinnis Darin N. |
| 5,164,154 A | 11/1992 | Brown et al. |
| 5,170,801 A | 12/1992 | Casper et al. |
| 5,188,405 A | 2/1993 | Maccaferri |
| 5,241,451 A * | 8/1993 | Walburn et al. ............... 24/453 |
| 5,269,213 A * | 12/1993 | Coneski et al. ............... 83/577 |
| 5,337,459 A | 8/1994 | Hogan ......................... 24/136 |
| 5,387,110 A * | 2/1995 | Kantner et al. ............. 403/110 |
| 5,439,310 A | 8/1995 | Evenson et al. ............. 403/321 |
| 5,466,083 A | 11/1995 | Hogg ........................... 403/46 |
| 5,476,014 A | 12/1995 | Lampe et al. |
| 5,485,733 A | 1/1996 | Hoffman |
| 5,570,992 A | 11/1996 | Lemelson |
| 5,600,977 A | 2/1997 | Piron |
| 5,712,469 A | 1/1998 | Chaffin et al. .............. 219/765 |
| 5,775,524 A | 7/1998 | Dunham |
| 5,870,914 A | 2/1999 | Dawson |
| 5,901,894 A | 5/1999 | Melocco |
| 5,910,894 A | 6/1999 | Pryor |
| 5,917,726 A | 6/1999 | Pryor |
| 6,008,992 A | 12/1999 | Kawakami et al. |
| 6,084,498 A | 7/2000 | Stelter et al. |
| 6,089,253 A | 7/2000 | Stehling et al. |
| 6,367,843 B1 | 4/2002 | Fetzer |
| 6,438,954 B1 | 8/2002 | Goetz et al. |
| 6,499,907 B1 * | 12/2002 | Baur .......................... 403/188 |
| 6,553,321 B2 | 4/2003 | Siegel et al. |
| 6,598,684 B2 | 7/2003 | Watanabe |
| 6,872,439 B2 | 3/2005 | Fearing et al. |
| 6,944,920 B2 | 9/2005 | Browne et al. |
| 2002/0040949 A1 | 4/2002 | Brei et al. |
| 2004/0003683 A1 | 1/2004 | Rudduck |
| 2004/0104580 A1 | 6/2004 | Splessi et al. |
| 2006/0012191 A1 | 1/2006 | Brei et al. |

FOREIGN PATENT DOCUMENTS

| | | |
|---|---|---|
| BE | 840618 A | 10/1976 |
| DE | 19620782 | 12/1996 |
| DE | 10104833 | 8/2002 |
| EP | 297552 A2 | 1/1989 |
| EP | 0324083 | 7/1989 |
| EP | 324083 A1 | 7/1989 |
| EP | 0297552 | 12/1993 |
| EP | WO 99/43961 * | 2/1999 |
| GB | 1388973 | 4/1975 |
| GB | 2131869 | 6/1984 |
| GB | 2260162 A | 4/1993 |
| JP | 63191526 A | 8/1988 |
| JP | 8241753 A | 9/1996 |
| JP | 2001015956 A | 1/2001 |
| RU | 2019739 C1 | 9/1994 |
| RU | 2065091 C1 | 8/1995 |
| RU | 2091554 | 9/1997 |
| RU | 2094325 | 10/1997 |
| SU | 787200 | 12/1980 |
| SU | 1348125 | 10/1987 |
| SU | 95-153470/20 | 8/1993 |
| SU | 1838548 | 8/1993 |
| WO | WO-95/31313 A1 | 11/1995 |
| WO | WO 96/09870 A1 | 4/1996 |
| WO | WO 96/23942 A1 | 8/1996 |
| WO | WO-00/64639 A1 | 11/2000 |

OTHER PUBLICATIONS

"OBD-II", http://obdii.com/background.html.
"Target Applications," http://www.lin-subbus.org/main.asp?cls=online&method=view&id=970.
Nice, K., "How Car Computers Work", http://howstuffworks.lycoszone.com/car-computer.htm/printable.
International Search Report for International Patent Application No. PCT/AU03/00759, filed Jun. 19, 2003.
"Magnetic Lock", Aug. 28, 2002.
ENVIROEQUIP, "A Locking Well Cap with a Magnetic Key", Aug. 30, 2002.
CARFIX "Magnet Seat Belt", Aug. 29, 2002.
Custodian® Hydrant Lock, Sep. 9, 2002.
Warwick Manufacturing Group "Magnetic Lock Holds Injection Molding Tools", Sep. 9, 2002.
Protect Enfant Inc. Cabinet and Drawer Magnetic Latch, Sep. 9, 2002.
Nova Design Group, "Nova Bi-Polar Device", Sep. 9, 2002.
SEGUFIX "Bandage System: Component Parts", Sep. 9, 2002.
Security Co. "MagLatch Series", Sep. 9, 2002.
SEGUFIX "Segufix Bandage System", Nov. 29, 2002.

* cited by examiner

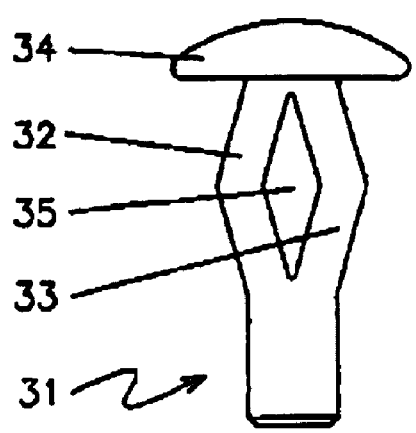
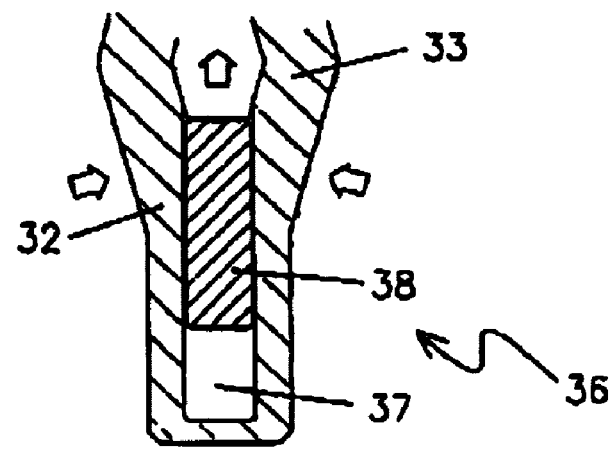
FIGURE 7  FIGURE 8
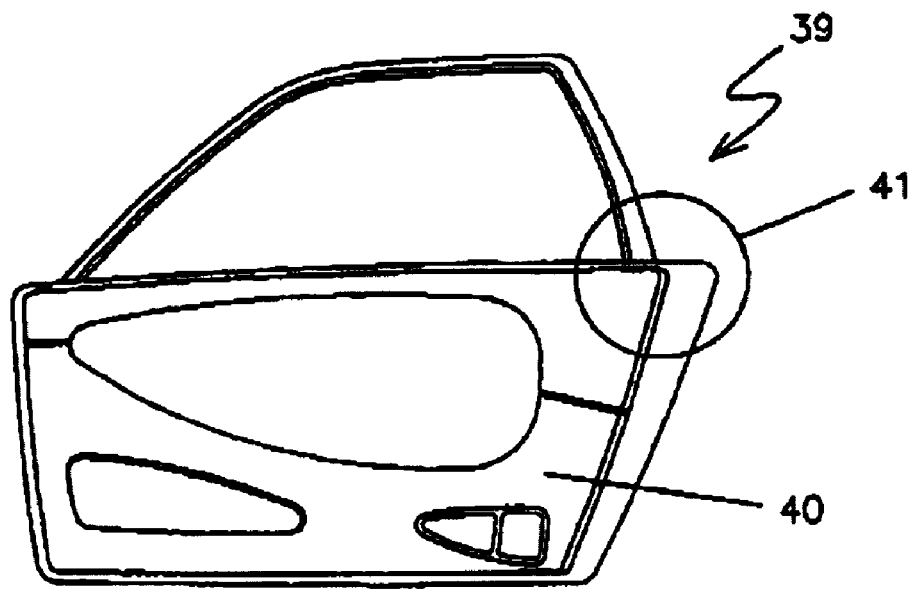
FIGURE 9

FIXING AND RELEASE SYSTEMS

TECHNICAL FIELD

This invention lies in the field of fixing and/or release systems for a myriad of products and applications. This invention also relates to connectors for use in fixing and release systems.

BACKGROUND ART

The need to fix one element to another, such as a panel to a stud, has given rise to a large technology relating to fasteners. Primitive versions, such as nails and screws, are labour intensive and have the drawback that the fixing means are visible externally. It is desirable to fix one element to another so that the fixing means are not visible externally. This desirability may be based on aesthetic or economic reasons. For some applications, it may be desirable that the fixing means are not visible externally, for security purposes.

Common construction practice is to provide a first fixing stage, followed by a "final fix" stage. This is labour intensive and generally results in post-finishing. It is desirable to eliminate the need for the first fixing stage and to fix only after assembly has been completed.

Further, common methods of fixing are rarely reversible without damage to the elements being fixed. It is desirable to devise a fixing system which, at least in some aspects, is reversible without damage.

Still further, it is common to fix one element to another by the use of connectors which are separate from the first and second elements. It is desirable to incorporate at least part of a connector in a first or second element.

DISCLOSURE OF THE INVENTION

In one aspect, this invention relates to a system of fixing one element to another using remote means. In another aspect, this invention relates to a system which enables the remote fixing and remote release of elements. In still another aspect, this invention relates to a system which can provide information as to the status of the relationship between elements, for example whether they are fixed or not and whether they have been released or not. In some forms, this invention relates to fixing or release in a sequential manner between elements. Other aspects will also be disclosed in the following description.

It will be appreciated that, in some fields, remote fixing and release is a precursor to self-assembly.

The systems of this invention have particular application to the building industry. However, the invention is not limited to this area and has application in many other arts. For the sake of convenience, in many cases the description below will relate to the building industry.

Accordingly, in one aspect, this invention provides a connecting means adapted to releasably fix a first element and a second element, the connecting means including a locking means movable by remote activation means between a locked position in which the first elements is locked to the second element and an unlocked position in which the first element is released from the second element, characterised in that there is no permanent material connection (as herein defined) between the connecting means and the remote activation means. The invention also provides a method of releasably fixing a first element and a second element via a connecting means, the method including the step of applying remote activation means to fix the first element to the second element, the connecting means being movable by the remote activation means to a locked position in which the first element is fixed to the second element, characterised in that the connecting means is movable by the or another remote activation means to an unlocked position in which the first element is released from the second element and further characterised in that there is no permanent material connection (as herein defined) between the remote activation means and the connecting means.

Preferably, the fixing and/or the release can be effected without marking or damaging the first and second elements.

In the systems of the invention, there may be more than two elements which are fixed or released. For example, one first element may be fixed to or released from a plurality of second elements; a plurality of first elements may be fixed to or released from a single second element; or a plurality of first elements may be fixed to or released from a plurality of second elements. Further, where there is a plurality of elements, these need not be identical. A plurality of first elements may differ from one another, a plurality of second elements may differ from one another.

The remote fixing or release means may be any suitable means and many of these will be apparent to persons skilled in the various relevant arts. Non-limiting examples of remote fixing and release means are set out below.

In the connecting means and method of the invention, there is no permanent material connection between the connecting means and the remote activation means. In the specification and claims, a "material connection" means a connection which has physical substance, i.e., substance made of matter, and excludes a connection made through energy.

The remote fixing means may provide the force or message required to activate fixing or release of the elements. Examples are the use of magnetic attraction or repulsion, the use of high frequency heating or radio frequency heating, the transmission of a message via a radio or other waves and so on.

In its simplest forms, the systems of the invention may cause the pushing of two elements together, or the locking of those elements, or the pushing of those two elements apart, or the unlocking of those elements. In this regard, there may be a connecting means which can be regarded as "obedient" to the force or message generated by the remote fixing means.

In more sophisticated versions of the systems of the invention, the message can convey instructions (eg. digitally) which will enable the elements to move towards one another or apart from one another, or a connector between them to open or close. In particular, the message may cause movement in any or all of three dimensions. Thus, for example, a first element may be caused to move, relatively to the second element, longitudinally or laterally. A first element may be caused to rotate relatively to a second element.

In yet more sophisticated versions of the systems of the invention, it may be possible not only to transfer messages, but also to receive reports. For example, it may be possible to receive a report as to whether two elements are in a fixed state or in a released state, or whether the connection between them has been damaged or is stressed, for example because of movement as result of an earthquake or because of tampering, such as an attempt to gain access to an electrical duct.

Further, encryption may be included in the systems of the invention, to incorporate security. This can be useful, for example, where it is desired to restrict access to elements or to objects or material for which the elements provide a barrier. One example is the fixing of airplane parts, where access to part inspection, removal or replacement is to be restricted to authorised persons. The incorporation of encryption into the systems of the invention can require an appropriately coded activation means in order to permit fixing or release of the elements.

These last-mentioned examples of the systems of the invention can be regarded as "intelligent obedient" versions, since not only is there response to a message or force provided by the remote means, but also feedback can be obtained as to state of the fixing or release and access can be restricted in an appropriate manner. Further, this version can preent access without appropriate authorisation and can provide a record of the time of fixing or release. Thus, for example, unauthorised access to a petrol or gas pump may be prevented and the time of use of the pump by authorised users can be recorded.

In one version of the "intelligent obedient" systems of the invention, a report can be obtained as to the location of the fixing or release mechanism.

Another advantage which the "intelligent obedient" systems of the invention can have is to prevent unauthorised release after assembly (of the elements) has been completed.

The ability of the systems of the invention, in one form, to move one element relative to the other, in any of three dimensions, provides an enormous boost to the problems encountered in the building industry, where wall height, for example, can vary by 50 to 60 millimetres; the present invention, in some aspects, makes it possible to effect required adjustments on site. This permits tolerance, for example, vertically, and gives the capacity to deal with orthogonal movement.

It will be appreciated that, in those versions of the systems of the invention which enable release of the elements, the invention provides a ready means for demounting buildings or parts of buildings without the need for demolition and with the ability to preserve building elements for re-use.

Further, especially in the "intelligent obedient" form. It is possible to effect fixing or release of the elements in a set sequence. This can be useful, for example, when fixing a large panel to studs. It may be desired to fix the top and bottom corners first to ensure correct alignment and follow by fixing in other areas. In one version of the systems of the invention, the fixing of the four corners of the panel will activate in sequence the fixing at the subsidiary locations.

As has been stated above, this invention is not limited to application in the building industry. There are numerous other areas in which remote activation of a fixing or release of two elements relative to one another is desired. By way of example only, the following are mentioned. Where it is desired to maintain a sterile environment, such as in the packaging of blood, for example, the valve inside the packaging may be activated remotely in order to release the blood, in accordance with the blood. The activation may be carried out by applying a magnetic force, for example, to a disc in the valve which may be rotated or otherwise moved within the valve. It will be appreciate that sterility can be maintained in these circumstances.

The fixing and release system of the invention can be used to connect two pipes or conduits in a sterile manner, for example.

As another example, remote activation of fixing or release can be useful in the food industry, where the introduction of contamination is to be minimised.

The fixing or release of one element relative to the other may be effected using a connecting means separate from the elements or by using connecting means which are incorporated in the first or second elements, or both. This latter aspect may be regarded as part of "on board technology", which is discussed further, below.

As non-limiting examples of connecting means which are separate from the first and second elements, there may be mentioned the following:

A fastener having two parts, one being a female part which can be attached to one element during or after manufacture and the other being a male part attached to the second element during or after manufacture can be aligned so that the male part is received within the female part, following which locking of the male part to the female part is effected by remote means.

In another aspect, this invention provides a method of fixing a first element and a second element via a connecting means, the method including the steps of:
(a) locating the first element relatively to the second element in a chosen position;
(b) maintaining the chosen position by magnetic force; and
(c) applying remote activation means comprising radio frequency heating means to the connecting means inserted between the first and second elements, the connecting means being adhesive curable by radio frequency heating.

As an example, the connecting means may be glue or adhesive which is cured by RF heating, inserted at appropriate locations between the first and second element, after which the glue is cured by the application of RF heating and the elements are fixed one to the other. The first element is preferably a metal stud and the second element is preferably one or more panels. It is further preferred that the magnetic force is released after cure of the adhesive.

In another aspect of this invention, one element may be joined to another element in a spaced manner by elongated joiners, for example, for the purpose of inserting cabling between the elements. The joiners can then be activated by suitable means so that they collapse, allowing the elements to be fixed as closely to each other as the cabling or other material will allow.

Accordingly, this invention also provides a connecting means adapted to adjust the location of a first element relatively to a second element spaced from the first element, the connecting means including an arm extending through the space between the first element and the second element and being pivotally attached to the first element at a first attachment point and to the second element by a second attachment point, characterised in that the arm is adapted to pivot at the first and second attachment points, thereby reducing the space between the first and second elements, upon application of remote activation means and further characterised in that there is no permanent material connection (as herein defined) between the connecting means and the remote activation means).

As an example of "on board technology", which is discussed in further detail below, one element may have protrusions, while the other element may have recesses or pits adapted to receive the protrusions, so that after remote activation, one element is fixed to the other and optionally can be released from the other after further activation.

The remote fixing or release system of the invention has a very wide field of application, indeed. Some of these will now be mentioned. It is to be understood that means are in no way limiting on the scope of the invention.

When a power cable connected to a power plug is plugged into a power socket, the plug maybe removed whether or not the power is switched on. This can have safety ramifications. By using the remote fixing and release system of the invention, it is possible to lock the power plug into the socket when the power is switched on. For example, the power plug may include a locking element and the power socket may include a receiving element. Activation of the "power on" switch can not only cause current to flow through the power cable but, in accordance with the invention, can also fix the locking element to the receiving element, thus preventing withdrawal of the plug from the socket for as long as the "power on" switch is activated. When the "power on" switch is turned off, not only will electricity cease to flow but also the locking element will be released from the receiving element and the power plug can be withdrawn from the socket.

In many situations, signs need to be enclosed in a tamper-proof covering. For example, bus timetables which need to be displayed at bus stops are best inserted beneath glass or perspex. Using the remote fixing and release system of the invention, it will be possible to use connectors to connect glass or perspex to a backing board. The connectors are activated by remote activation means, such as by a radio signal. Thus timetables and other information may be changed or updated by authorised personnel using approved equipment.

The remote fixing and release system of the invention may also be used to provide security. For example, a computer may be programmed so that it can be released from a cable only after a password has been accepted. For example, the cable may be inserted in the relevant port on the computer to connect power. As soon as the power is connected, the cable plug is fixed within the port and cannot be removed until a series of steps (referred to below) are taken. The fixing of the cable plug to the port may be effected in the following way, as an illustration. The cable plug has (separately from the pins or cavities mating with the port on the computer) a pair of deformable plugs, each of which has a central cylindrical cavity. Each plug fits into a cavity provided near the computer port. As soon as the power is turned on, a pin is caused to enter the cylindrical cavity in the plug and locks the plug into the cavity. The person using the computer logs on and performs the desired tasks. When it is desired to log off, the usual procedures are followed but, before the cable can be disconnected from the computer, it is necessary to enter a password to reverse the locking procedure and release the cable. The computer can then be shut down.

Using the system of the invention, cables for computer equipment and mobile telephones, for example, can act as security devices, preventing unauthorised removal of the computer equipment or telephones.

The system of the invention can have application in relation to security of other items, for example television receivers, video recorders and sound systems. Using radio frequency, for example, as the remote activation means, such valuable items may be fixed to larger items of furniture or to walls, floors or ceilings. These valuable items may be fixed individually or in a specific order, thus immobilising them. When it is desired to move furniture or any of the valuable items, activation of the radio frequency device will release the locks.

Similarly, the remote fixing and release system of the invention can provide security when travelling. As an example, saddle bags can be connected to racks on bicycles and released as desired using remote activation means in accordance with the invention.

In the case of valuable equipment such as photographic equipment, the camera can be releasably fastened to a tripod. The lens and lens cap can also be locked onto the camera, all to be removed only after use of correct access codes.

It will be readily appreciated that the remote fixing and release system of the present invention can provide security for artwork, without the need for unsightly locks, cables or similar means. Casings on burglar alarms may be made secure, with access only by authorised means.

In the case of automotive accessories and trims, such as spoilers, driving lights, roof racks, air covers, components, radios, cassette decks, CD players, wheel nuts and so on, fixing and release may be effected using the system of the invention, providing convenient fixing in the first place and security thereafter.

Locking and release of vehicle doors can be effected remotely, for example by having a connecting element surround the perimeter of the door and being fixable to a complementary element around the door cavity.

Access to black box recording devices in aircraft may be restricted as a security means, using the remote fixing and release system of the invention. There are many applications where the remote fixing or release system of the invention can effect fixing in a more efficient and aesthetically acceptable manner than at present. For example, using the system of the invention it is possible to temporarily sound proof a room. For instance, a frame can be applied to the walls and ceilings of the room. Sound proofing panels can then be fixed to those frames using remote activation means. Because no fixing through the panels is required, sound proofing is more complete. When the room is no longer required to be sound proofed, the panels can be released from the frames, using the remote activation means.

As another example, the erection of billboards is possible using hidden fixing according to the system of the invention. In this way, it is possible to dispense with the use of messy adhesives and to overcome the problem of misalignment.

Items may become multifunctonal with the effectiveness of the system of the invention in fixing one element to another until it is desired to release it. For example, it is contemplated that one can provide a multi-purpose boot with a sole which can be removed using remote activation means. A sole suitable for hiking may be attached when that activity is to be undertaken. The same boot may be used for football or similar sporting activities by substitution of a different sole. The boot may be fixed to a ski, for skiing, and so forth.

In public toilets there is a problem with maintaining a sufficient supply of paper towels and toilet paper while protecting such consumables against theft and damage. While at present these are usually dispensed from a locked dispenser, it is not possible to protect against unauthorised tampering with the dispenser, since the locking screws or the like need to be accessible. Because the remote fixing and release system of the invention allows the fixing means to be hidden and not accessible without the use of authorised means, this problem can be overcome according to the present invention. A toilet roll or paper dispenser may be locked onto a wall or other mount, with the locking means being hidden under the dispenser and locked or released by the remote activation means.

The system of the invention can be used to fasten carpets or rugs onto floors, to substitute for combination dial locks on luggage and other cases, to fix Christmas decorations on buildings and other structures. The system of the invention can be used to prevent access to dangerous items by children, such as to medicine cabinets and through pool fences.

Access to coins collected in coin operated machines can be restricted to those having authorisation using the system of the invention.

Braces, dentures and false teeth generally may be fixed in position using the system of the invention and released when required.

Shop fittings may be constructed in a desired manner and rearranged later using the system of the invention.

Fire extinguishers may be locked into position to prevent theft, but releasable by authorised means, or the sounding of an alarm.

Fire arms may be stored securely using the system of the invention, preventing unauthorised use.

Shipping crates may be locked using the system of the invention so that drugs or other illegal goods cannot be deposited in them.

Prosthetic joints may be installed with increased mobility and greater efficiency of joints using the system of the invention.

A dog collar may be joined around the neck of a dog using the system of the invention and released when required. The dog collar may include an electronic locating device, together with registration and owner details, all stored electronically.

Furniture and building components may be quickly and easily assembled and disassembled.

Batteries and access cards on mobile phones may be locked into position to discourage theft, using the system of the invention.

Cladding on buildings may be installed quickly, but also easily removed for renovations or repair using the system of the invention.

Applicances may have access panels fixed by using the system of the invention, to prevent unauthorised access and enable enforcement of warranties.

In the case of tools, interchangeable tool bits may be locked into position using the system of the invention and released when desired, as can accessories for kitchen appliances, for example.

Peripherals on computers, such as the mouse, an external disk drive, an external CD ROM, etc. can be secured to a computer by using the system of the invention, with a security code being required to release the peripherals, in a manner similar to that described above in connection with computer cabling.

Street furniture may be secured to surrounding structures by using the system of the invention, providing security while in situ and enabling easy removal for maintenance or repair.

Buildings, including domestic dwellings, can have all external entrances, windows, power supply and utilities locked off using the system of the invention. The remote activation means may comprise a coded key or radio frequency activation, for example. Activation may occur as a result of a signal from a mobile telephone, as another example.

Turning now to "on board technology", this invention also provides a first panel adaptable for releasable connection to a second panel by a connecting means, the connecting means including a locking means movable by remote activation means between a locked position in which the first panel is locked to the second panel and an unlocked position in which the first panel is released from the second panel, there being no permanent material connection (as herein defined) between the connecting means and the remove activation means, wherein each panel has a pair of opposed faces, the first panel having on one face a plurality of rows of protrusions adapted to be received in a set of recesses arranged in a plurality of rows on one face of the second panel. In another aspect, this invention provides a first panel adapted for releasable connection to a second panel by a connecting means, the connecting means the connecting means including a locking means movable by remote activation means between a locked position in which the first panel is released from the second panel and an unlocked position in which the first panel is released from the second panel, there being no permanent material connection (as herein defined) between the connecting means and the remote activation means, wherein each panel has a pair of opposed faces, the first panel having on one face a plurality of protrusions being ribs, adapted to be received in recesses being channels on one face of the second panel.

The second panel in each of these aspects is also part of this invention.

The "on board" technology is preferably incorporated at the point of manufacture and may eliminate or greatly reduce the finishing or re-finishing of the panel.

Broadly, "on board technology" principles can be applied to the areas of fitting, fixing and finishing. In relation to the areas of fixing and fitting, an element such as a panel, for example, may be provided with means for fitting the panel to a stud, for example. An instance of this is the insertion of a longitudinal groove down one edge of a panel, into which may be received a clipping member, which in turn can fit the panel to the stud. Likewise, the panel may incorporate a longitudinal tongue which can connect directly to the stud or to a groove in a clipping member which can then connect to the stud.

As an example of the fixing aspect, reference is made to the aspect of the invention where the panels have protrusions or recesses which can cooperate with corresponding recesses or protrusions on other panels. These are arranged on a face of each element, so that the elements can be fixed face to face. These may also be arranged in other locations on the elements, such as along the edges.

The "on board technology" may include grooves, pits, ribs, lumps, recesses or protrusions and these may be continuous or isolated. As further examples, there may be textures or embossing or undercut grooves or recesses on panels, for the purpose of adding a texture to one or more faces of panels, in order to provide traction during fixing, or to provide a decorative finish.

In relation to finishing, "on board technology" may provide elements with a selected finish, such as a decorative finish, textured or not, which can obviate the need for further treatment of the element after building or other assembly has been completed. Thus, for example, there may be no need to paint the element after assembly or building.

It will be readily appreciated by those skilled in the art that "on board technology" enables the manufacturer of the elements to build in added value to the elements, and increase the profit of the manufacturer, since a higher price may be charged for the elements with "on board technology", because subsequent treatment may be reduced.

It will be readily appreciated that "on board technology" may be used together with the fixing and release systems of the invention, or independently.

In yet another aspect, this invention provides a method of manufacturing an element which is intended for connection with a second element, the first element incorporating first means to facilitate connection of the first element with the second element, the method including the steps of depositing discrete amounts of setable material on a surface of the element and rotating the element through 180° to permit the material to set under the influence of gravity. If desired, the setable material may be further treated to effect setting.

BRIEF DESCRIPTION OF THE DRAWINGS

The invention in its various aspects will now be described with reference to certain drawings thereof, in which:

FIG. 5 shows in sectional view, in situ between first and second elements, another embodiment of the connecting means, while

FIG. 7 shows inside elevation a prior art canoe clip, used, for example, to secure upholstery linings to vehicle doors, as well as many other applications;

FIG. 8 shows in sectional view the lower part of a canoe clip modified to form a connecting means in accordance with the invention;

FIG. 9 shows the interior of a vehicle door illustrating one use of the connecting means of FIG. 8;

BEST MODES FOR CARRYING OUT THE INVENTION

Figure 1:
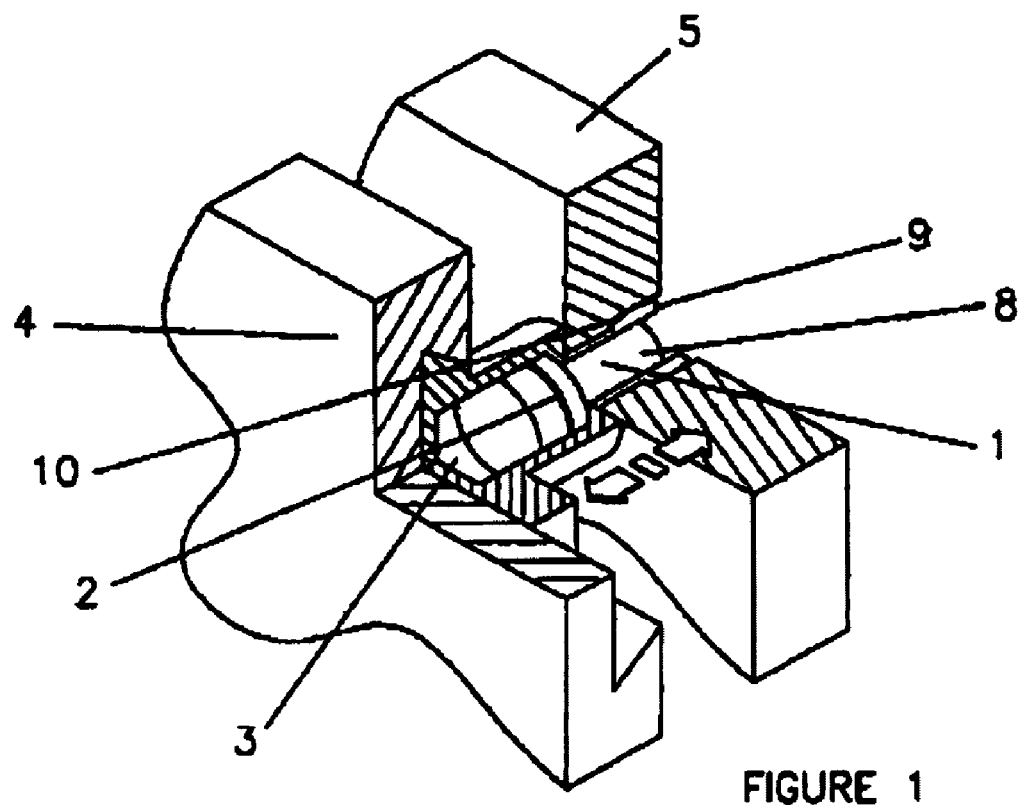
FIG. 1 is a perspective view, partly broken away, showing alignment of a first element with a second element before application of remote activation means to fix the first element to the second element.

Referring first to FIG. 1, locking pin 1 is injection moulded from a suitable plastic material and includes a metal strip 2. Locking pin 1 lies in recess 3 between first element 4 and second element 5. Recess 3 has a narrow end 6 which lies within element 5.

Figure 2:
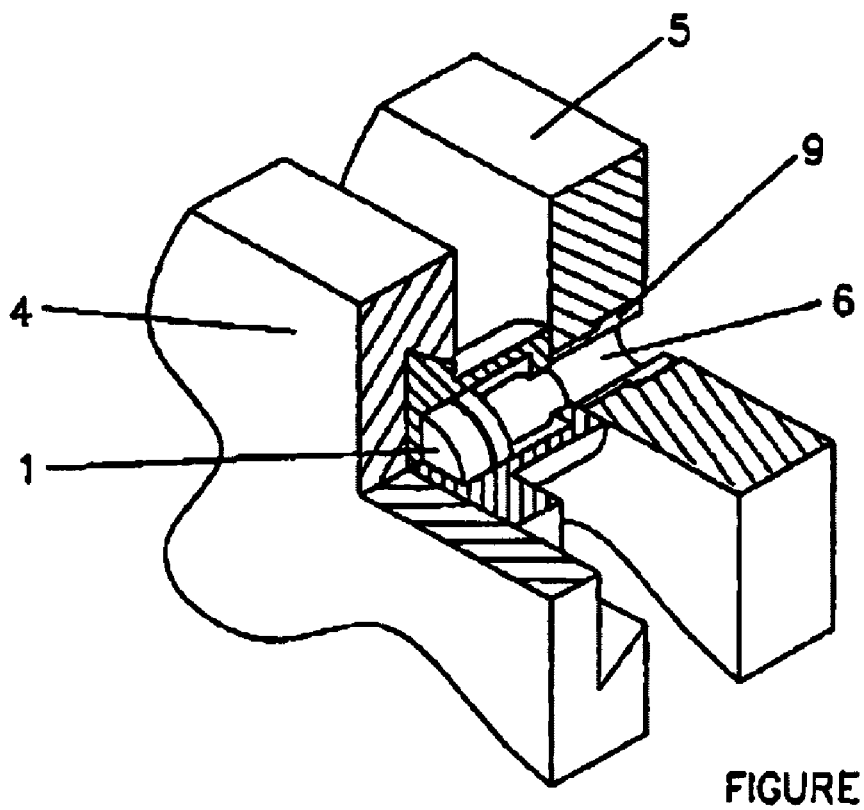
FIG. 2 is an enlarged view of the elements of FIG. 1 after the first element has been fixed to the second element by the application of remote activation means to a locking pin.

When a magnetic force is applied to locking pin 1, it is caused to move within recess 3 as shown in FIG. 2, so that leg 8 of locking pin 1 is pushed into narrow recess 6, in turn expanding wall 9 so that it locks into the recess 10 provided in element 5.

Locking pin 1 may be reversed, so that elements 4 and 5 may be released, by the use of magnetic force. Magnetic attraction may be applied for fixing elements 4 and 5 and magnetic repulsion for releasing them, or vice versa. Alternately, the same magnetic force may be applied on opposite sides—for example, on the side near element 4 for fixing and on the side near element 5 for releasing.

Figure 3:
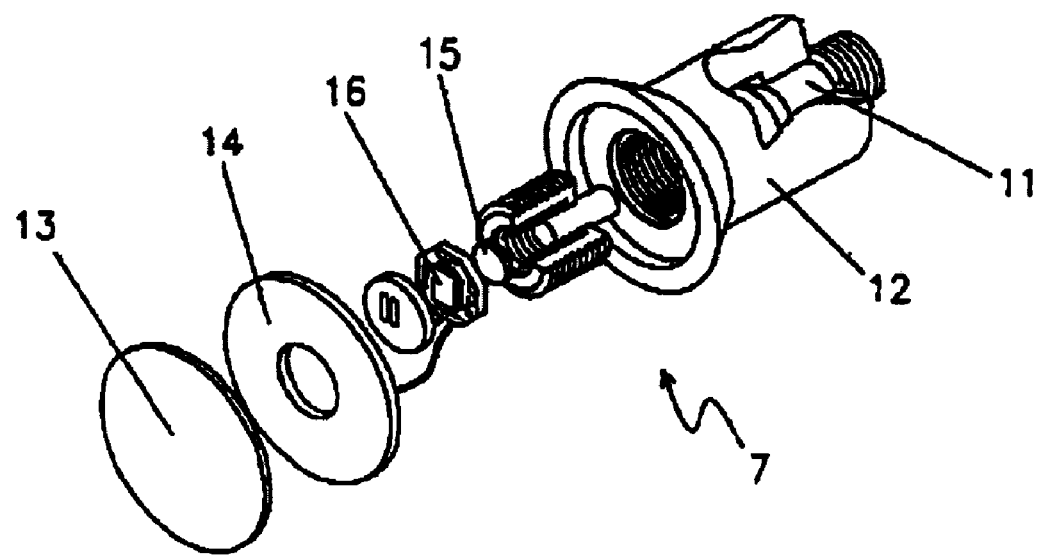
FIG. 3 shows in exploded form an isometric view of connecting means.
Figure 4:
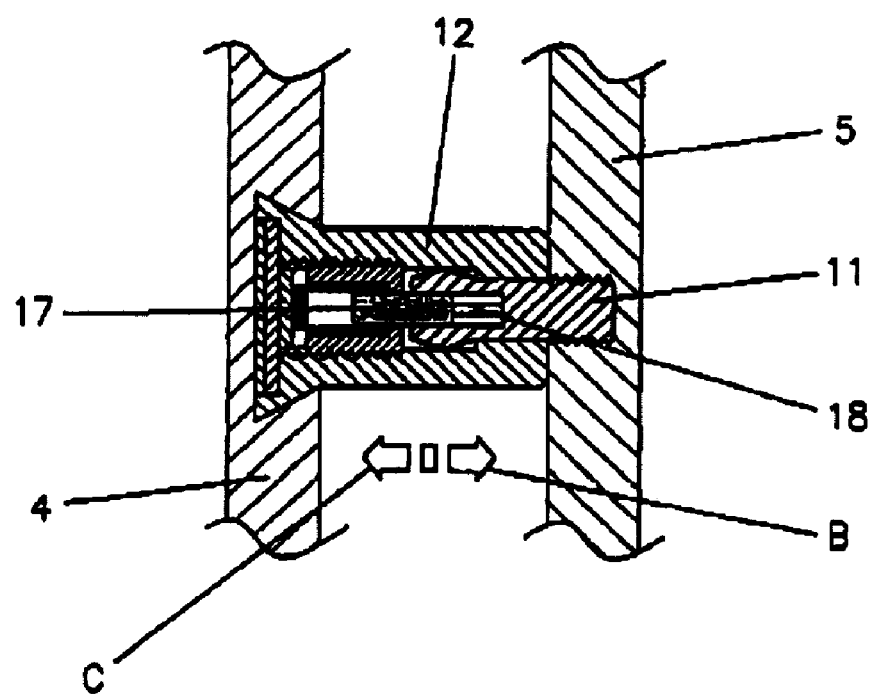
FIG. 4 shows in sectional view the connecting means of FIG. 3 in situ between first and second elements.

Turning now to FIG. 3, the connecting means 7 illustrated includes a wall plug 11 which can be screw threaded into second element 5 (refer FIG. 4) and a cooperating member 12 which includes aerial 13, capacitor 14, switch 15 and encryption logic chip 16. Cooperating member 12 is able to act as a receiver/transmitter and is inserted in first element 4.

To fix first element 4 to second element 5, plug 11 inserted in element 5 is aligned with member 12 inserted in element 4. A message is sent, for example, via radio waves, to aerial 13 in member 12 to activate switch 15 which in turn causes plug 17 to travel into cavity 18 in the direction of arrow B provided in wall plug 11. Element 4 is thus fixed to element 5.

Encryption logic chip 16 may be capable of providing a report as to whether the connection between element 4 and element 5 has been stressed, such as by an earthquake or tremor.

Alternately or in addition, the movement of plug 17 into cavity 18 may transmit a signal to other connecting means which may then be caused to activate. As indicated above, this can be useful in providing a predetermined sequence of fixing, so that a large panel may be fixed at the four corners first, followed by automatic activation of the other fixing points.

To release element 4 from element 5, a message can be sent via radio waves to aerial 13 in member 12 to activate switch 15 which will cause plug 17 to travel in the direction of arrow C. Plug 17 will be released from cavity 19 in plug 11 and element 4 can then be separated from element 5.

Figure 5:
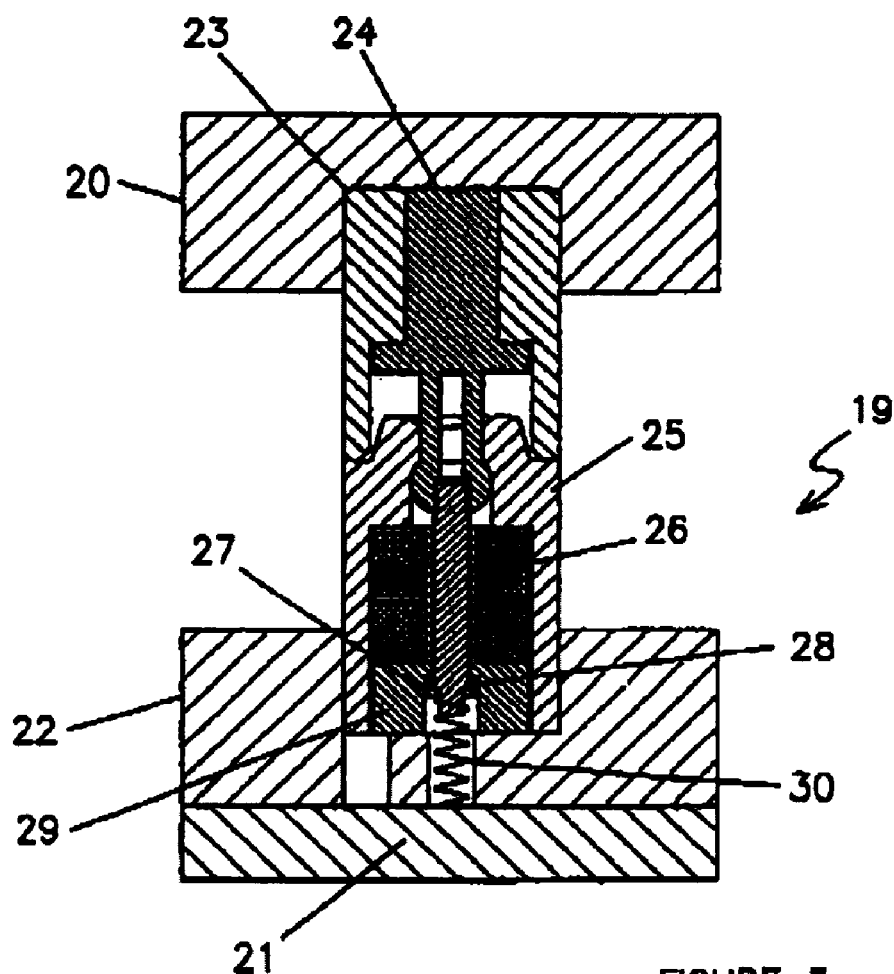
Figure 6:
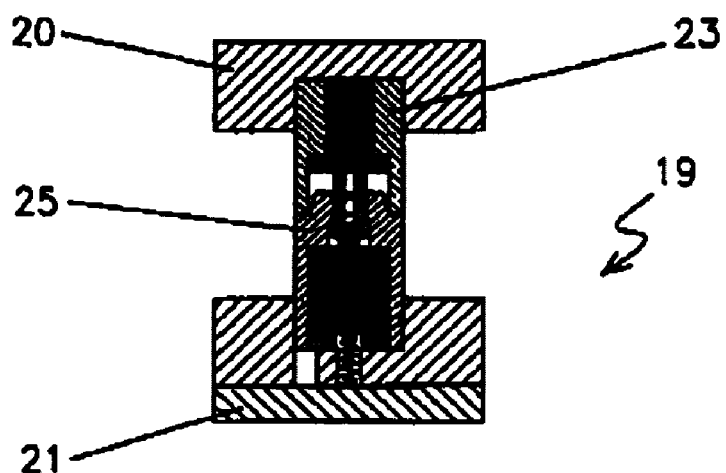
FIG. 6 shows the same view on a scale of 1:1, to show actual size.

With reference now to FIGS. 5 and 6, connecting means 19 is designed to be activated by electro magnetic means. Connecting means 19 has a top plate 20 of aluminium and a back fixing plate 21. Base plate 22 is of aluminum. Part 23 is made of acrylic material and surrounds nylon clip 24. Part 25 is also acrylic. Connecting means 19 also includes windings 26, washer 27, pin 28, bobin 29 (Teflon—trade mark) and spring 30.

As can be seen from FIG. 6, connecting means 19 in actual size is small and neat and eminently suitable for connecting a first element to a second element.

The canoe clip 31 in FIG. 7 is a prior art clip with flexible arms 32 and 33 and a stud 34. As is well known in the art, canoe clip 31 is pushed into the desired cavity. Arms 32 and 33 compress to take up space 35 and once canoe clip 31 has been pushed sufficiently through the cavity so that arms 32 and 33 are no longer constrained, they spring out again to the configuration shown in FIG. 7, thus retaining canoe clip 31 in place.

In the improvement to canoe clip 31 shown in FIG. 8 according to the invention, connecting means 36 shows how, if cavity 37 contains a moveable locking pin 38, activatable by remote means according to the invention, once connecting means 36 has been pushed into position, like the prior art canoe clip 31, locking pin 38 can be moved between arms 32 and 33 to prevent them coming together. Thus, connecting means 36 will fix first and second elements (not shown) together, until locking pin 38 is released by remote activation means.

In FIG. 9, vehicle door 39 has trim 40 connected to interior of vehicle door 39 by the connecting means of the invention 36, for example, in the region indicated by circle 41. Thus, by using the connecting means of the invention, it is possible to ensure that only factory—approved equipment is used in connection with maintenance of a vehicle.

Figure 10:
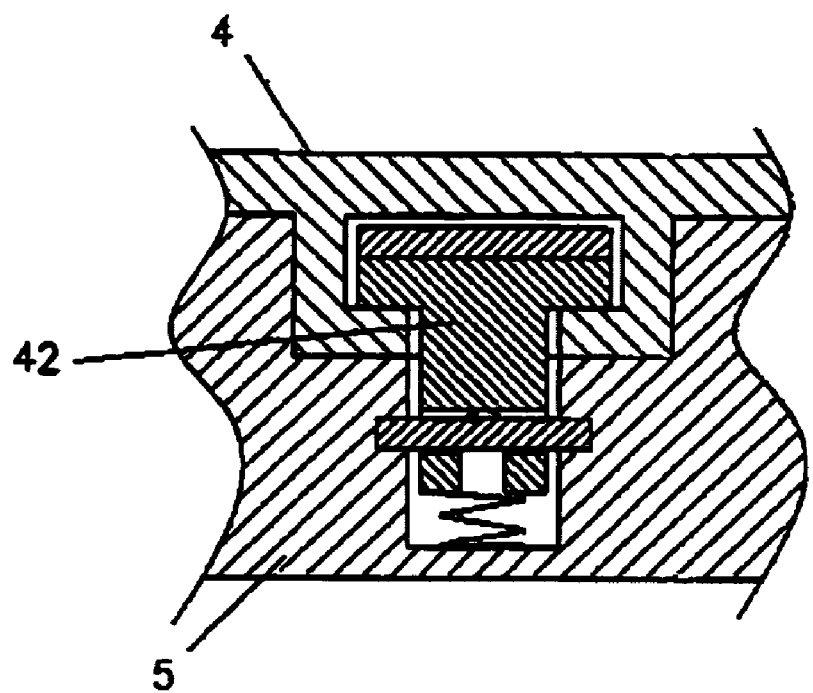
FIG. 10 is a sectional view of another form of connecting means according to the invention, shown in situ between a first element and a second element.
Figure 11:
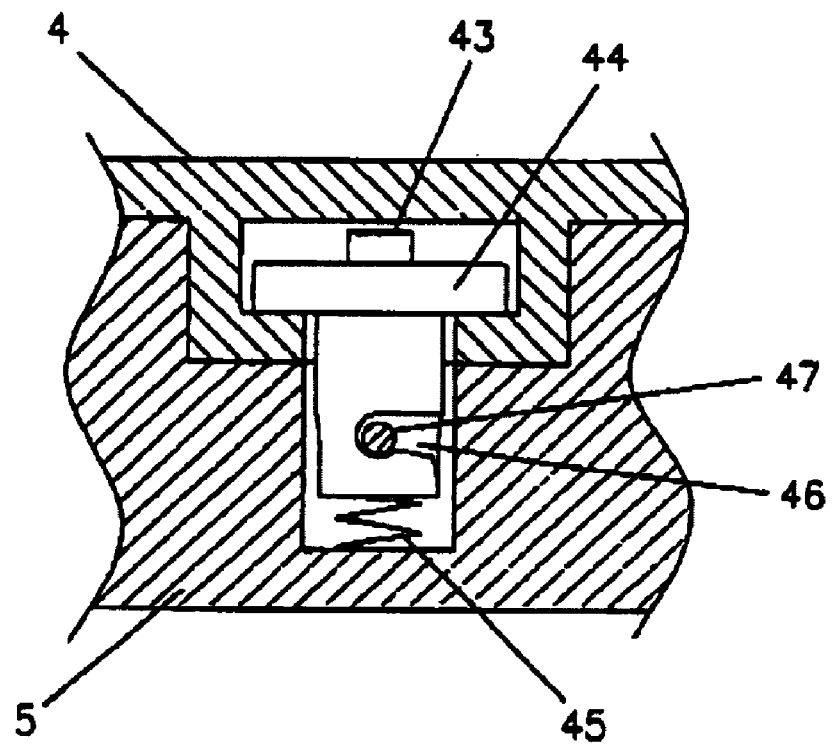
FIG. 11 shows the connecting means of FIG. 10 in the locked position.
Figure 12:
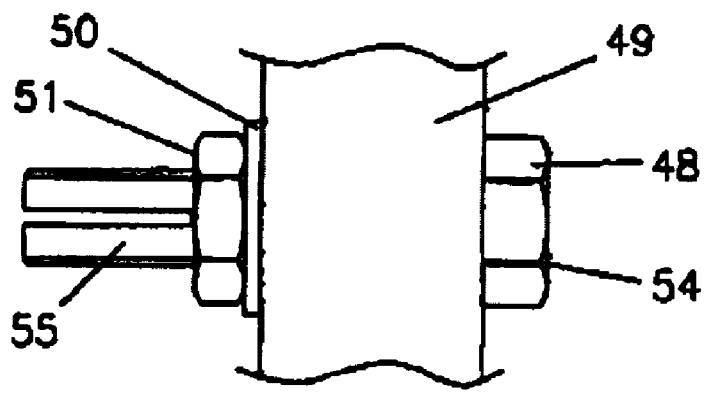
FIG. 12 is a side view of a bolt and nut assembly.

With reference now to FIGS. 10 and 11, connecting means 42 is based on the known "quarter turn" fastener. Connecting means 42 is shown in position between first element 4 and second element 5. As can be seen from FIGS. 10 and 11, connecting means 42 does not breach the face surface of element 4, so that element 4 can present a completely blank face for aesthetic or security reasons. Connecting means 42 has a drive magnet 43 and a plunger 44, biased by spring 45. When plunger 44 is caused to press down against spring 45 and rotate, by magnetic or electromagnetic means, channel 46 engages rod 47 to hold connecting means 42 in the locked position, thus connecting elements 4 and 5. Elements 4 and 5 can be released by applying a remote activation means to rotate plunger 44 in the opposition direction, so that rod 47 is disengaged by channel 46.

Reference is now made to FIGS. 12 to 18. These Figures illustrate the application of the invention to the rapid assembly and disassembly of a bolt and nut. Bolt 48 is shown inserted through a panel 49 with a washer 50 inserted between panel 49 and nut 51.

Figure 13:
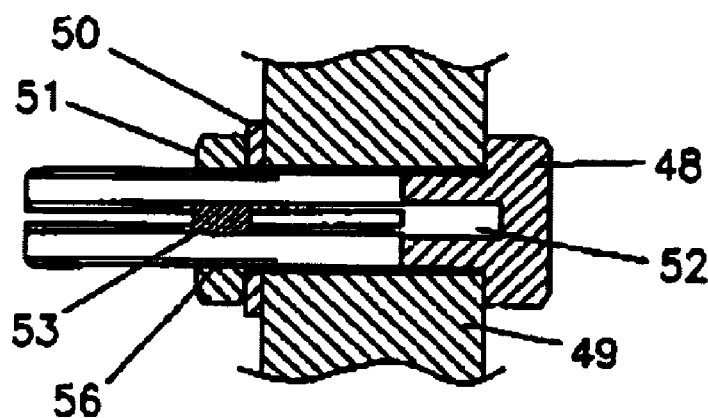
FIG. 13 is a sectional side view of the bolt and nut assembly of FIG. 12, showing the bolt inserted into the nut and locked.
Figure 14:
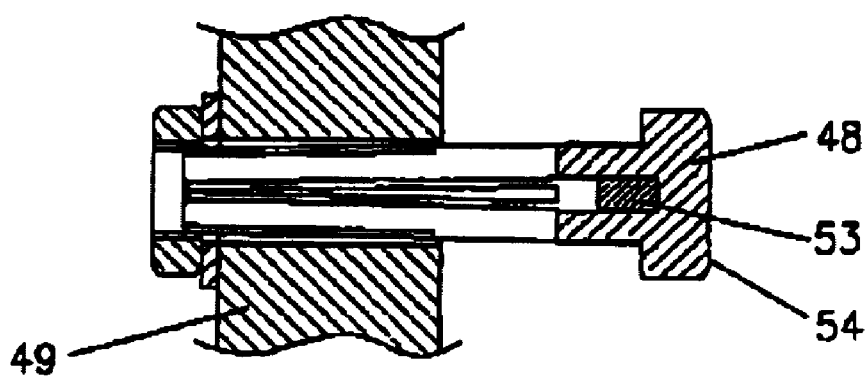
FIG. 14 is a sectional side view of the assembly of FIGS. 12 and 13, showing the bolt being inserted into the nut.
Figure 15:
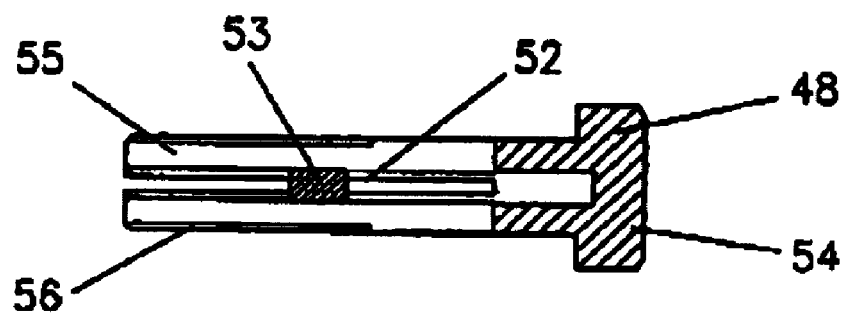
FIG. 15 illustrates the bolt of FIGS. 12, 13 and 14, showing the lock pin in the "locked" position.
Figure 16:
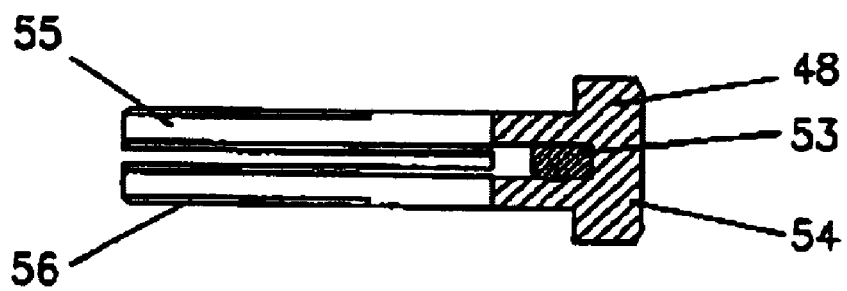
FIG. 16 is the view of the bolt of FIG. 15, showing the lock pin in the "unlocked" position.
Figure 17:
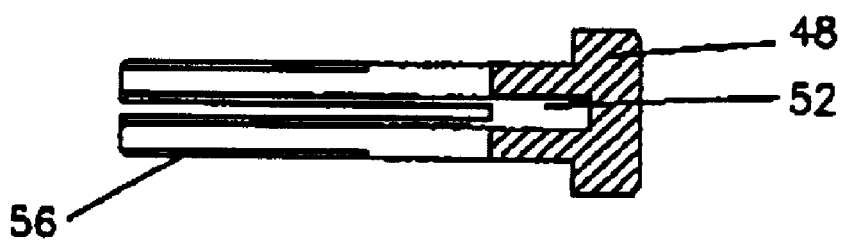
FIG. 17 is a sectional view of the bolt omitting the lock pin.
Figure 18:
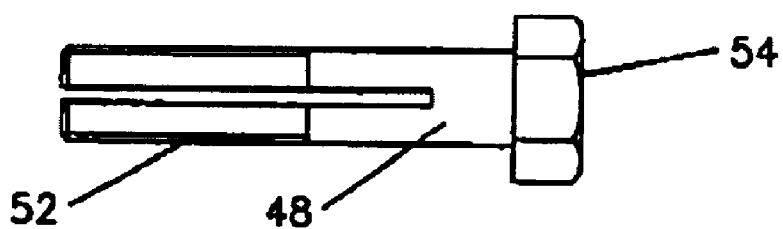
FIG. 18 is a side view of the bolt.

As shown in FIG. 13, bolt 39 includes channel 52 in which, according to the invention, there is inserted lock pin 53. In the unlocked position, lock pin 53 reposes in head 54 of bolt 58 (refer FIGS. 14 and 16). In the locked position (refer FIGS. 13 and 15), lock pin 53 has been caused to travel (by means of a magnet, lock pin 53 being metal) along channel 52, pushing the surrounding shank of bolt 48 outwardly so that external groove 56 engages nut 51. As will be appreciated by one skilled in the art, bolt 48 can be quickly disconnected from nut 51 by using magnetic means to retract lock pin 53 into head 54 of bolt 48.

Figure 19:
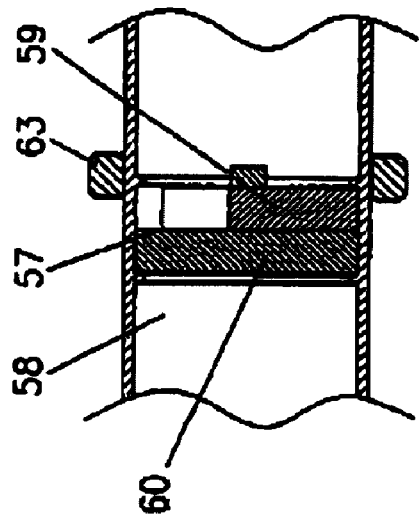
FIG. 19 is a sectional side view of a further embodiment of connecting means according to the invention, being in a valve with a single flow aperture.
Figure 20:
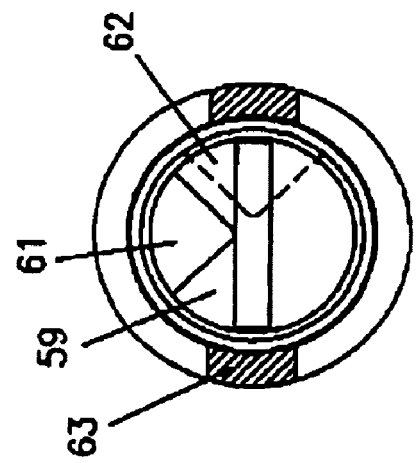
FIG. 20 is an end view of the valve of FIG. 19, showing the valve in the closed position.
Figure 21:
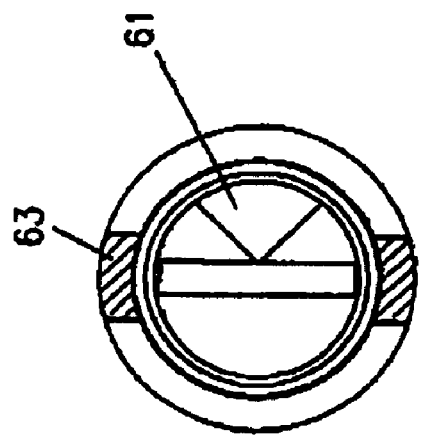
FIG. 21 is an end view of the valve of FIGS. 19 and 20, showing the valve in the open position.

With reference to FIG. 19 to 21, connecting means 57 is a valve for controlling flow within conduit 58. Valve 57 had a metal disk, 59 and 60, each of which has a cut out portion 61 and 62 respectively. When cut out portion 61 is aligned with cut out portion 62, as in FIG. 21, connecting means 57 represent the valve in the open position, allowing fluid to flow along conduit 58 through valve 57. When disk 59 is rotated relatively to disc 60, as shown in FIG. 20, valve 57 is closed. preventing flow of fluid along conduit 58 through valve 57. Disk 59 can be rotated to the open or closed position in valve 57 by the application of remote activation means. Thus, valve 57 can be opened or closed in a sterile environment. This can have importance in hospitals and other medical applications, for example. Illustrated in FIGS. 19 to 21 is a magnetic locking ring 63 which causes disk 59 to rotate relatively to disk 60. It will be appreciated that valve 57 may be opened or closed by using means other than magnetic means.

Figure 22:
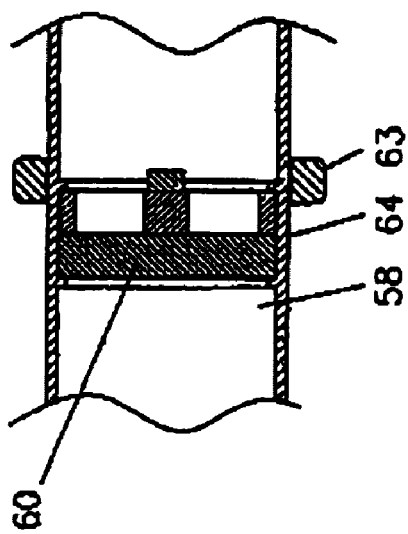
FIG. 22 is another version of a connecting means according to the invention in a valve having two flow holes.
Figure 23:
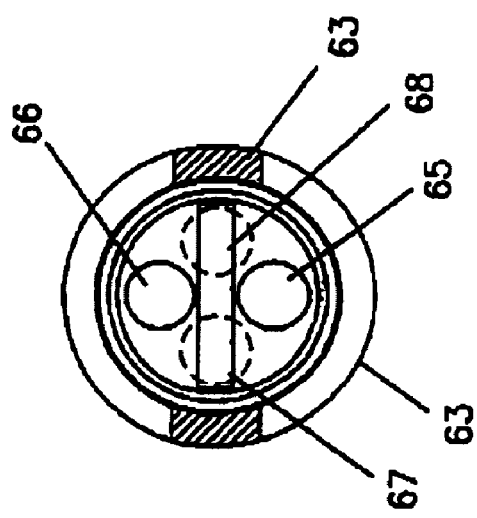
FIG. 23 is an end view of the valve in FIG. 22, showing the valve in the closed position.
Figure 24:
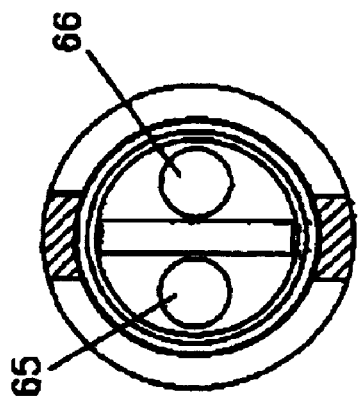
FIG. 24 shows the valve of FIGS. 22 and 23 with the valve open.

With reference now to FIGS. 22 to 24, connecting means 64 represents a double-apertured valve in conduit 58. Disk 59 is caused to rotate relatively to disk 60 by rotation of locking ring 63, as in the previous example. When aperture 65 and 66 on disk 59 are aligned with apertures 67 and 68 on disk 60, fluid can flow through valve 64, similarly, the flow of fluid can be halted by rotating locking ring 63 so that apertures 65 and 66 are not in alignment with apertures 67 and 68.

The connecting means of the invention need not be discrete; it may be linear or of indefinite length. This is illustrated by FIGS. 25 to 27.

Figure 25:
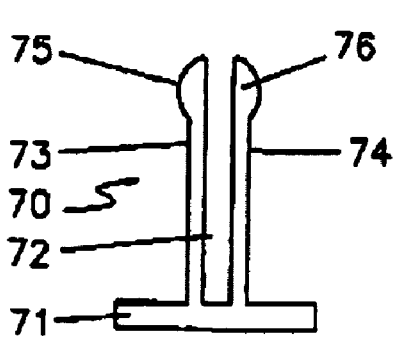
FIG. 25 shows in end view a linear connecting means according to the invention.
Figure 30:
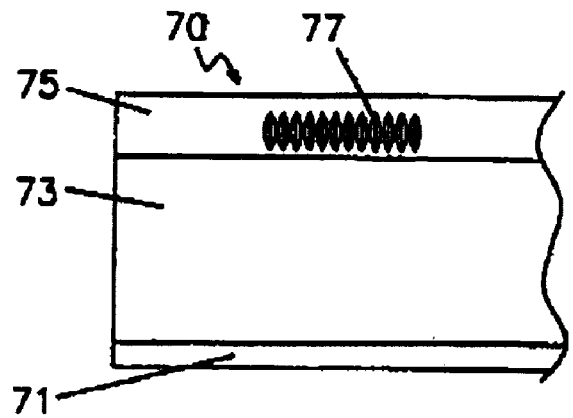
FIG. 30 is a side view of the connecting means of FIG. 25 showing optional teeth for longitudinal adjustment.
Figure 26:
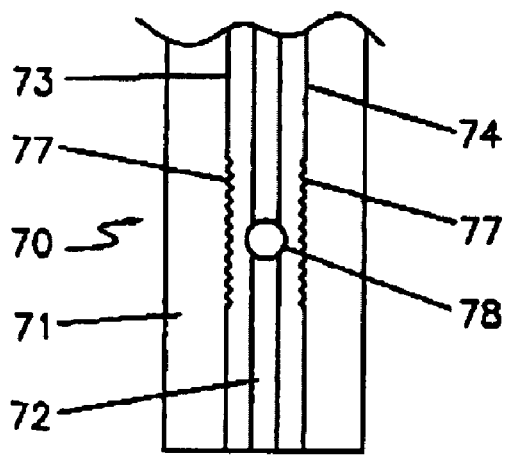
FIG. 26 is a top view of the connecting means of FIG. 25 showing a discrete locking pin.
Figure 27:
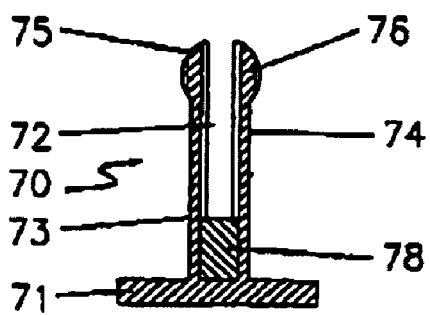
FIG. 27 is a sectional view of the connecting means of FIGS. 25 and 26.

Referring first to FIG. 25, connecting means 70 is linear and of indefinite length, as indicated by the top view in FIG. 26. Connecting means 70 has a base 71 and a channel 72 formed between channel sides 73 and 74. Channel sides 73 and 74 terminate in expanded portions 75 and 76 respectively, for locking into an element when the locking means are activated. Connecting means 70 may have locking teeth 77 along some or all of its length. Locking teeth 77 may be incorporated on one or both of expended portion 75 and 76. Locking teeth 77 can assist in longitudinal adjustment of one element relatively to another.

Figure 28:
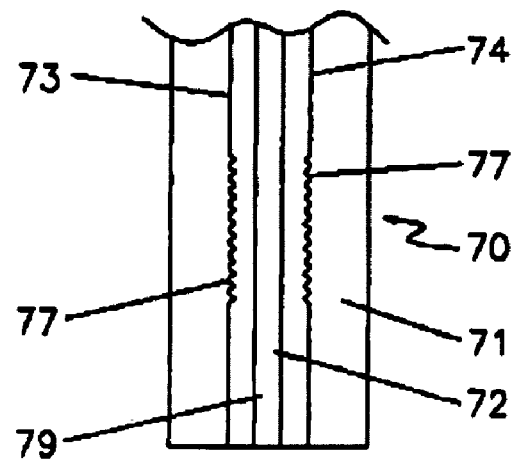
FIG. 28 is a top view of the connecting means of FIG. 25 with a continuous locking strip.
Figure 29:
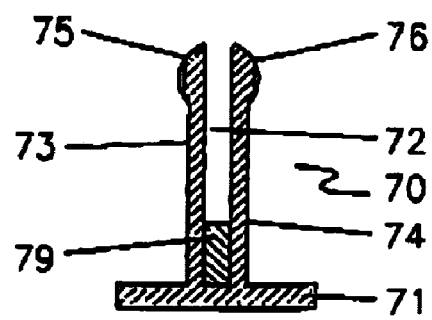
FIG. 29 is a sectional view of the connecting means of FIG. 28.

Connecting means 70 may have a plurality of discrete locking pins 78 (refer FIGS. 26 and 27) or a continuous locking strip 79 (refer FIGS. 28 and 29). In either case, the locking pin 78 or the locking strip 79 is activated by remote means to move in channel 72 upwardly to repose between expanded portions 75 and 76, thus preventing them from being deformed inwardly when connecting means 70 is in the locked position.

Figures 31, 32:
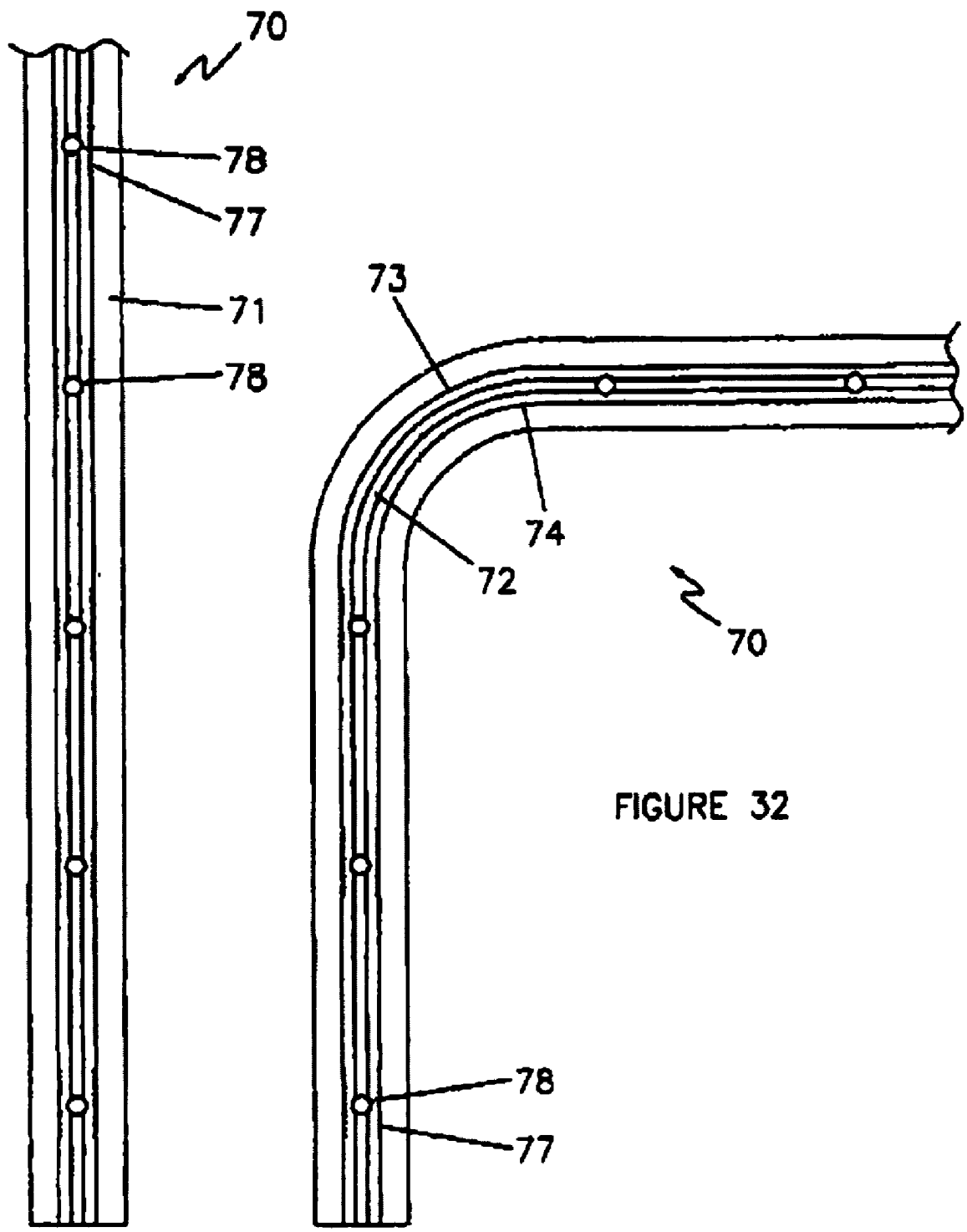
FIG. 31 is a plan view of part of the linear connecting means of FIG. 25, with discrete locking pins as in FIGS. 26 and 27.
FIG. 32 shows a version of the connecting means of FIG. 31 with a radiused corner, showing how the connecting means can follow a flexible path.

FIG. 31 shows an indefinite length of the connecting means 70 with discrete locking pins 78. FIG. 32 shows the same connecting means 70 in a flexible from so that it can be shaped around corners or around the perimeter of objects, such as vehicle doors, for example.

Figure 33:
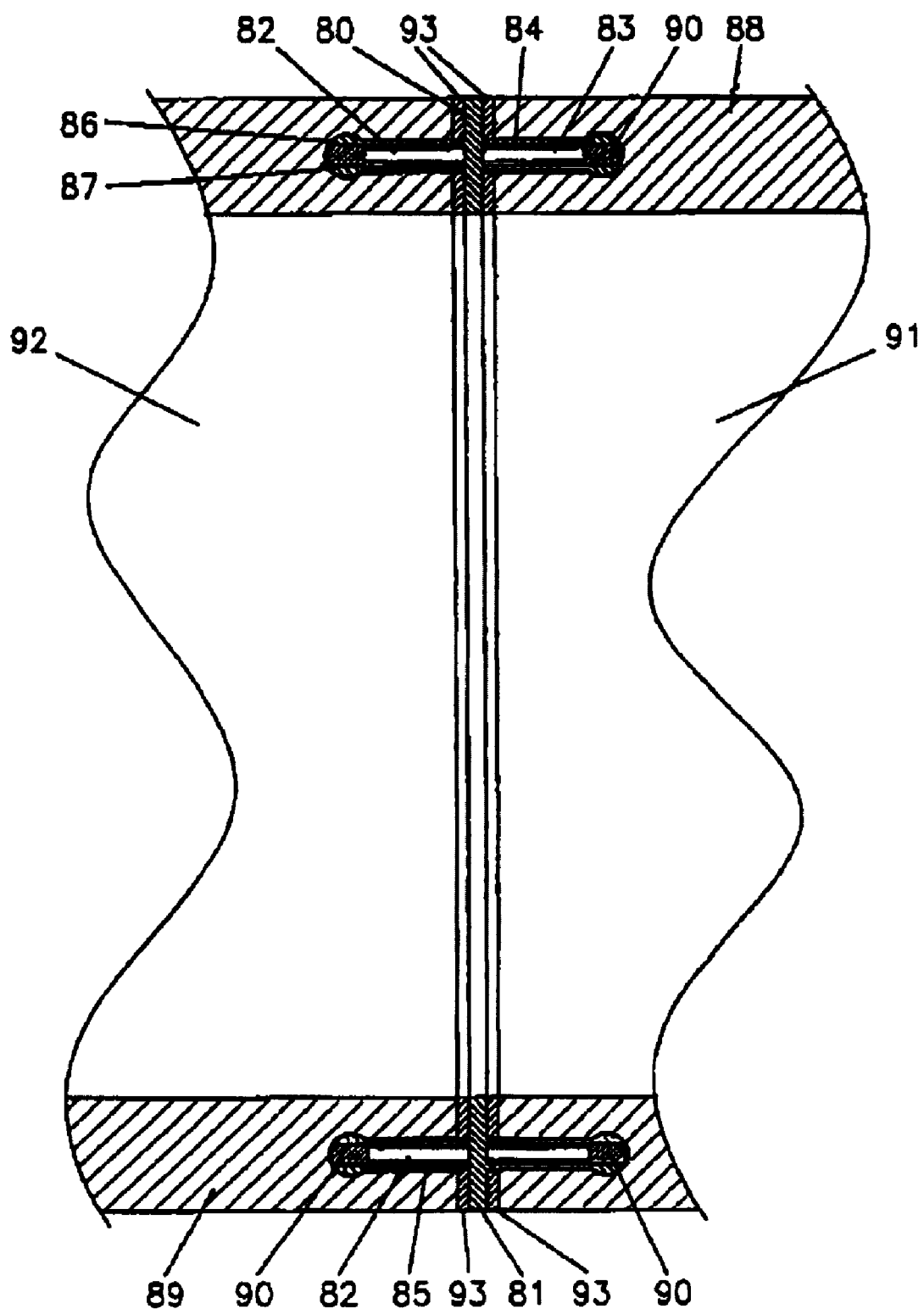
FIG. 33 shows in sectional view a first element and a second element, being two pipes, which are fixed in accordance with the method of the invention. The connecting means can be a continuous connecting means being a double-sided version of that in FIG. 25. The connecting means may have discrete locking pins or a continuous locking strip. The connecting means is shown in the locked position.

The connecting means of the invention can be used to fix (and subsequently release) first and second elements being pipes or the like. With reference to FIG. 33, connecting means 80 is formed as a double-sided version of linear connecting means 70, with a base 81 and channels 82 and 83, being coaxial, each formed between channel sides 84 and 85. As was the case with connecting means 70, each channel side terminates in expanded portions 86 and 87 which are designed to fit into a complementary cavity in pipe walls 88 and 89. Although connecting means 80 may have a continuous locking strip as in the embodiment in FIGS. 28 and 29, illustrated in FIG. 33 are discrete locking pins 90.

Base 81 may provide an adequate seal between pipes 91 and 92. However, especially in the case where pipes 91 and 92 are intended to carry fluid, it is optional to include seals 93.

It will be appreciated that, using the connecting means of the invention, locking pins 90 may be locked between expanded portions 86 and 87 by remote activation means, thus securing pipes 91 and 92 together until it is desired to release them by use of the remote activation means.

Figure 34:
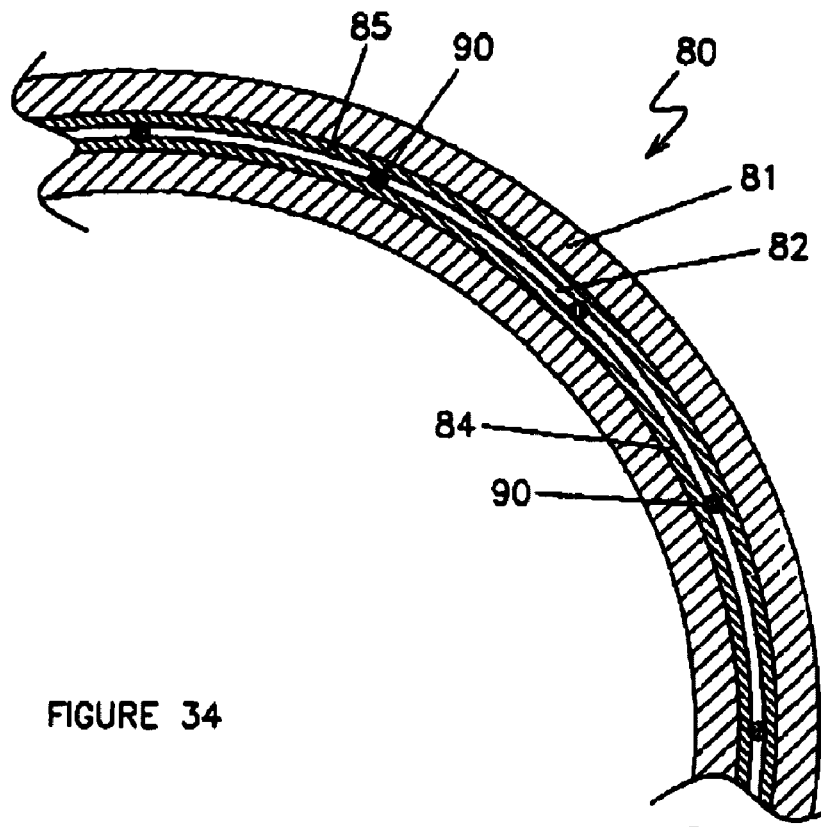
FIG. 34 shows the connecting means of FIG. 33 in partial cross-sectional view, in the discrete locking pin version.

FIG. 34 shows the connecting means 80 following the circumference of pipes 91 and 92.

Figure 35:
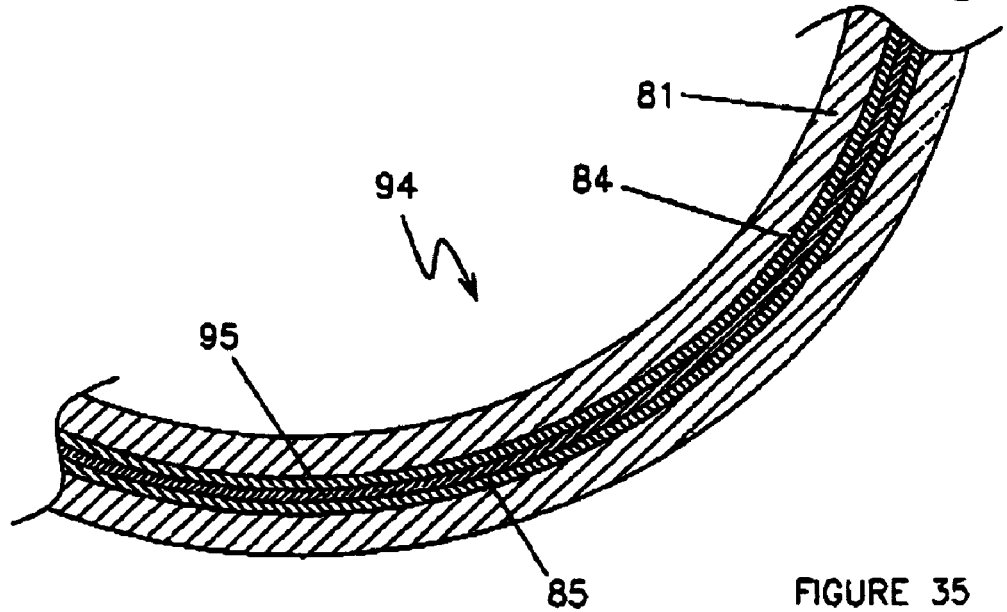
FIG. 35 shows the same connecting means of FIG. 33, showing the continuous locking strip version.

FIG. 35 shows an alternate version of a connecting means 94, with a continuous locking strip 95 instead of discrete locking pins 90.

Figure 36:
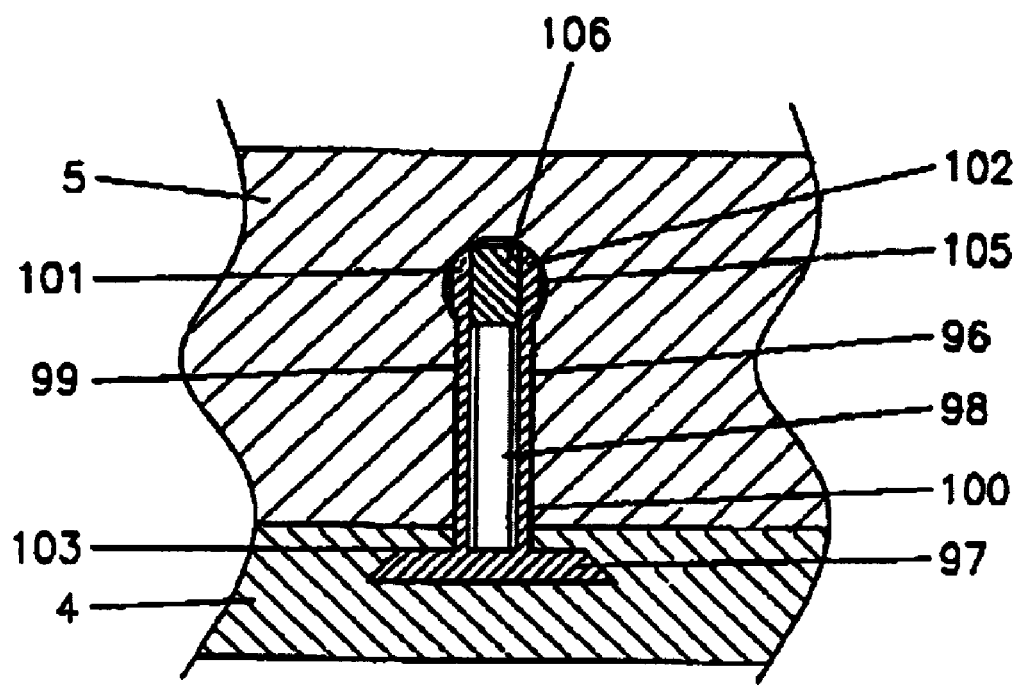
FIG. 36 is a sectional view of a linear connecting means according to the invention, in the "locked" position, the connecting means having discrete locking pins.
Figure 37:
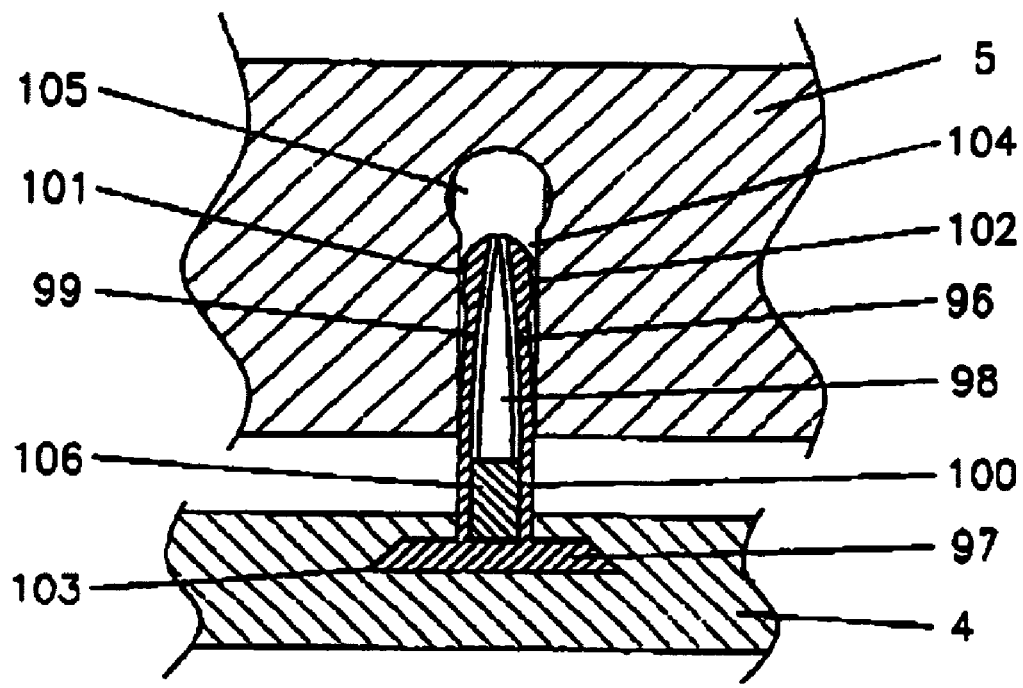
FIG. 37 is a sectional view of the linear connecting means of FIG. 36, during installation, showing the "unlocked" position.

A linear connecting means, such as that illustrated in FIGS. 25 to 35, can operate as shown in the detail in FIGS. 36 and 37. In FIGS. 36 and 37, connecting means 96 has, in this case, a dovetail shaped base 97 and, once again, a channel 98 formed between channel sides 99 and 100. Each of channel sides 99 and 100 terminates in an expanded portion 101 and 102. When it is desired to fix first element 4 to second element 5 (refer FIG. 37), connecting means 96 is inserted in a dovetail-shaped channel 103 in first element 4 and channel sides 99 and 100 are pressed into cavity 104 in second element 5. Channel sides 99 and 100 are caused to deform inwardly by the constraints of the sides of cavity 104, until expanded portions 101 and 102 reach the expanded part 105 of cavity 104, when channel sides 99 and 100 spring out to their normal position. It is at this stage that locking pin 106 can be activated by remote means, such as magnetic means, to move along channel 98 until it rests between expanded portions 101 and 102. Thus, expanded portions 101 and 102 are trapped within expanded part 105 of cavity 104, since channel sides 99 and 100 can no longer be deformed inwardly to release expanded portions 101 and 102. In this position, shown in FIG. 36, first element 4 is fixed to second element 5. It will be readily appreciated that reversing the procedure will permit first element 4 to be released from second element 5, without damage or marking to either element.

Figure 38:
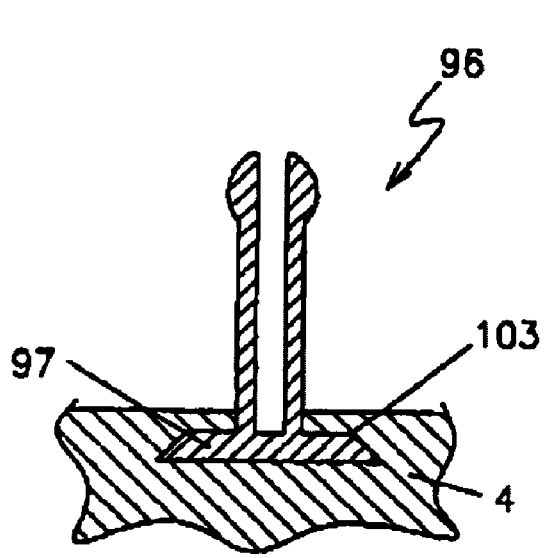
FIG. 38 shows a detail of the attachment of the connecting means of FIGS. 36 and 37 to a first element, in a dovetail cavity.
Figure 39:
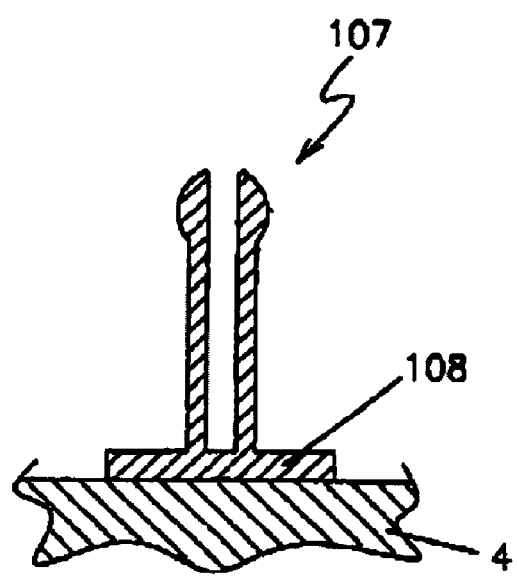
FIG. 39 shows an alternate means of attaching the connecting means of FIGS. 36 and 37 to a first element, being by way of adhesive on the surface of the first element.

Connecting means 96 is shown inserted in dovetail cavity 103 in element 4, in FIGS. 36 and 37 and also in FIG. 38. An alternate arrangement is shown in FIG. 39, where connecting means 107 has base 108, which is adhered or otherwise fixed to first element 4. Otherwise, connecting means 107 operates in the same way as connecting means 96.

Figure 40:
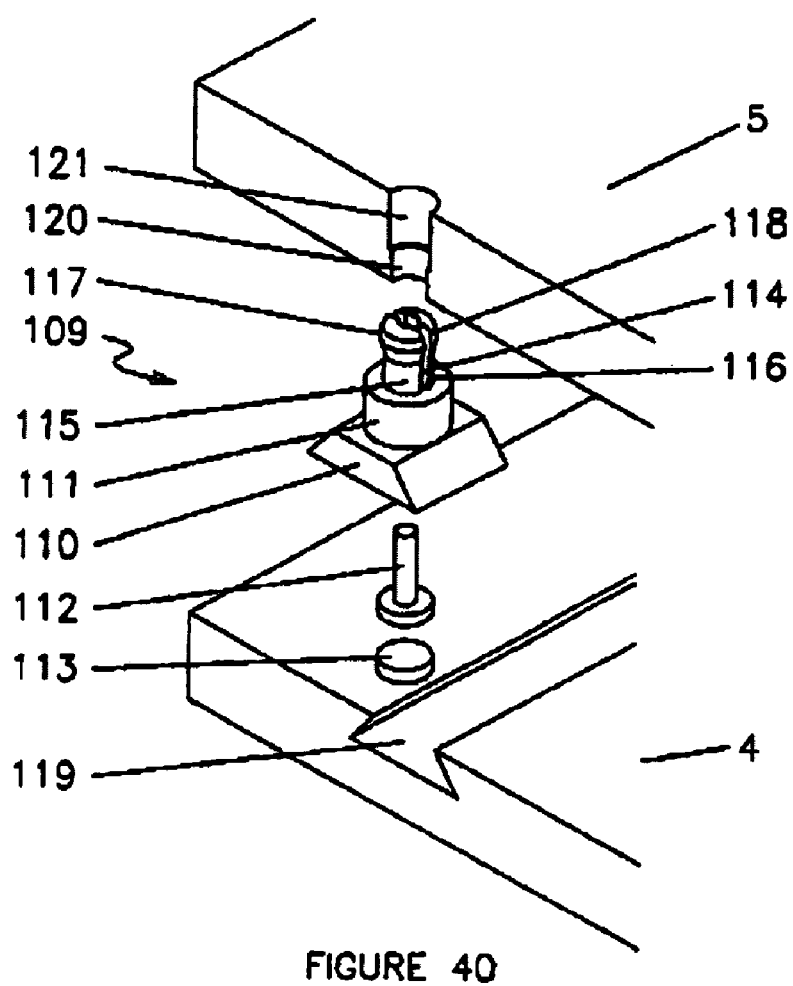
FIG. 40 is an isometric exploded view of a further embodiment of the connecting means according to the invention.

FIG. 40 is illustrated a discrete connecting means 109 which has a base 110 (dovetailed in cross-section), a housing 111 for locking pin 112 and plunger 113 and a channel 114 formed between channel sides 115 and 116. Channel sides 115 and 114 terminate in expanded positions 117 and 118.

Base 110 can be inserted in dovetail shaped channel 119 in first element 4. When connecting first element 4 to second element 5, channel sides 115 and 116 are pushed into cavity 120, deforming inwardly to channel 114 and then springing apart again into expanded part 121 of cavity 120. Locking pin 112 can then be activated and pushed by plunger 113 so that it occupies channel 114 between channel sides 115 and 116 and prevents them deforming so as to restrict withdrawal from expanded part 121 of cavity 120.

Figures 41, 42:
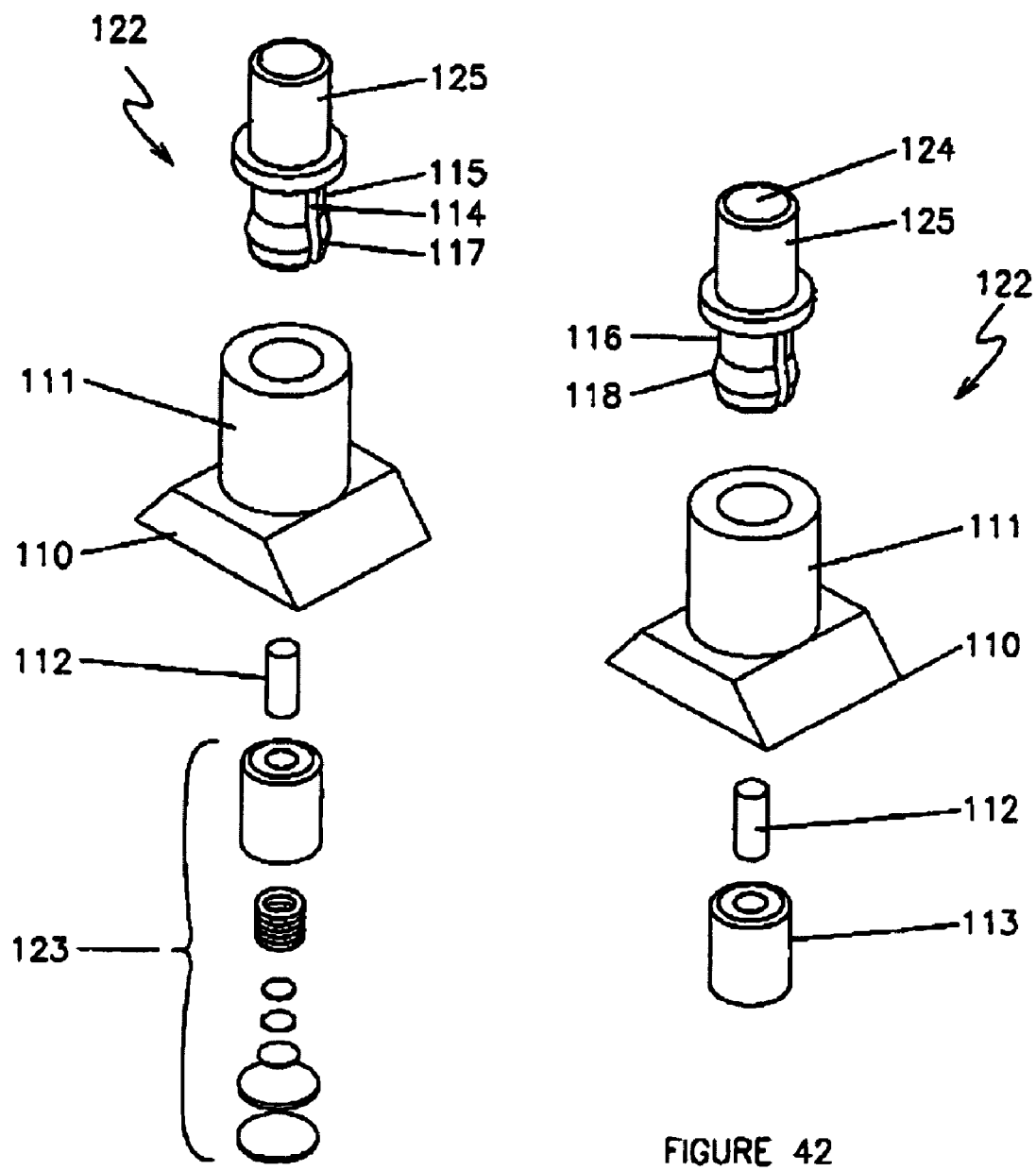
FIGS. 41 and 42 are isometric exploded views of a still further embodiment of the connecting means according to the invention.

The embodiments in FIGS. 41 and 42 of connecting means according to the invention are in essence a reversed form of the embodiment of connecting means 109 in FIG. 40. In FIGS. 41 and 42, connecting means 122 have base 110 and housing 111 together with locking pin 112 and plunger 113 or plunger assembly 123. Part 124 of connecting means 122 has shank 125 which is intended to be fixed to second element 5 (not show). Channel 114 formed by channel sides 115 and 116, together with expanded portions 117 and 118 enter housing 111 during fixing of element 4 to element 5. Locking pin 112 is then activated by remote means—for example, by a radio signal in the case of the embodiment in FIG. 41 and by a magnet in the case of the embodiment in FIG. 42, so that locking pin 112 moves between expanded portions 117 and 118 and locks element 4 to element 5.

Figure 43:
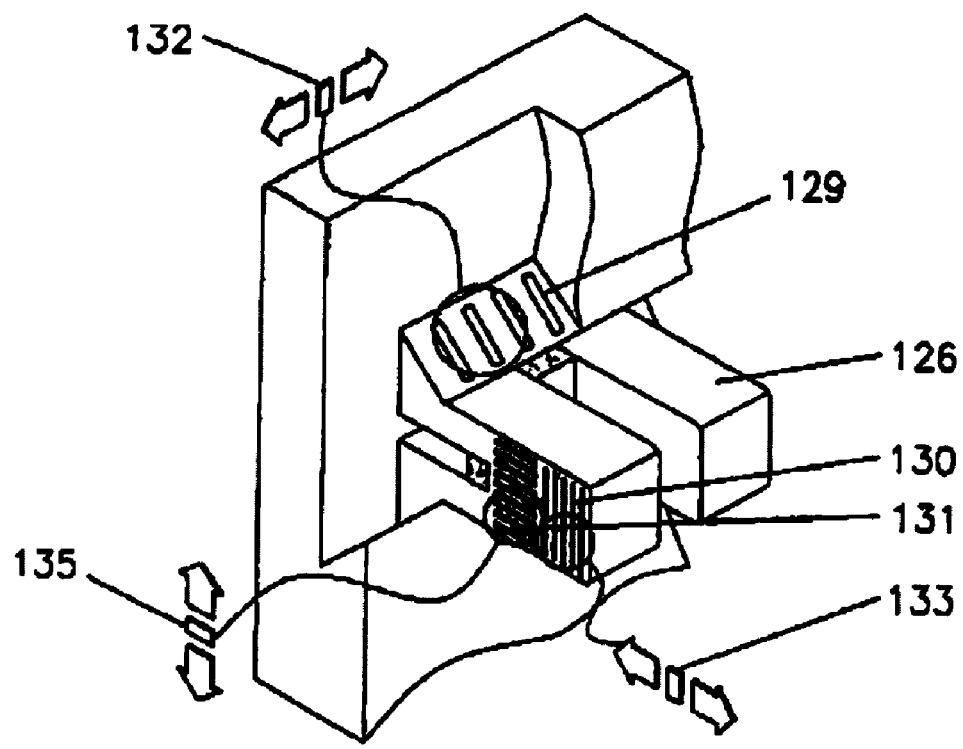
FIG. 43 shows a connecting means which is capable of adjusting the first and second elements in vertical and horizontal directions, allowing adjustability in three dimensions.
Figure 44:
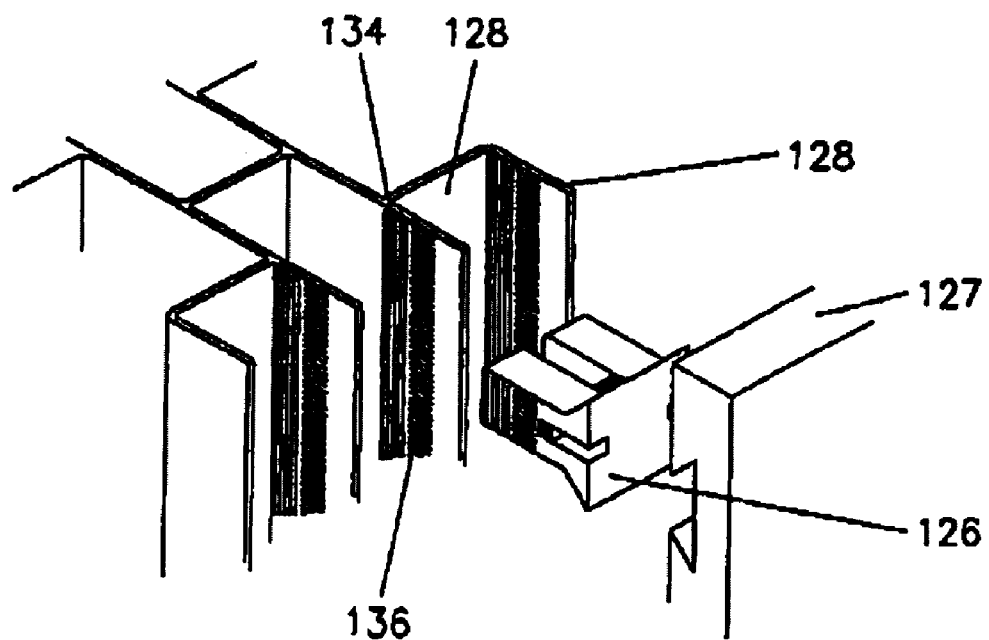
FIG. 44 shows the connecting means of FIG. 43 set up to fix a wall panel (first element) to a stud (second element)

With reference now to FIGS. 43 and 44, FIG. 43 shows a connecting means 126 adapted to be fitted to a first element (wall panel 127) and to be fixed to a second element, stud 128. Connecting means 126 has three sets of ribs, 129, 130 and 131. Ribs 129 permit adjustment of connecting means 126 (and panel 127) to the left and right as shown by arrow 132. Ribs 130 provide for adjustment in the in/out direction as shown by arrow 133. Ribs 130 can lock into extruded locking ribs 134 on stud 128. Ribs 131 provide for up/down adjustment in the direction shown by arrow 135 and can mesh with knurled locking ribs 136 on stud 128. Thus, panel 127 can be adjusted in the desired position before activating means (not shown) fix connecting means 126 to stud 128.

Figure 45:
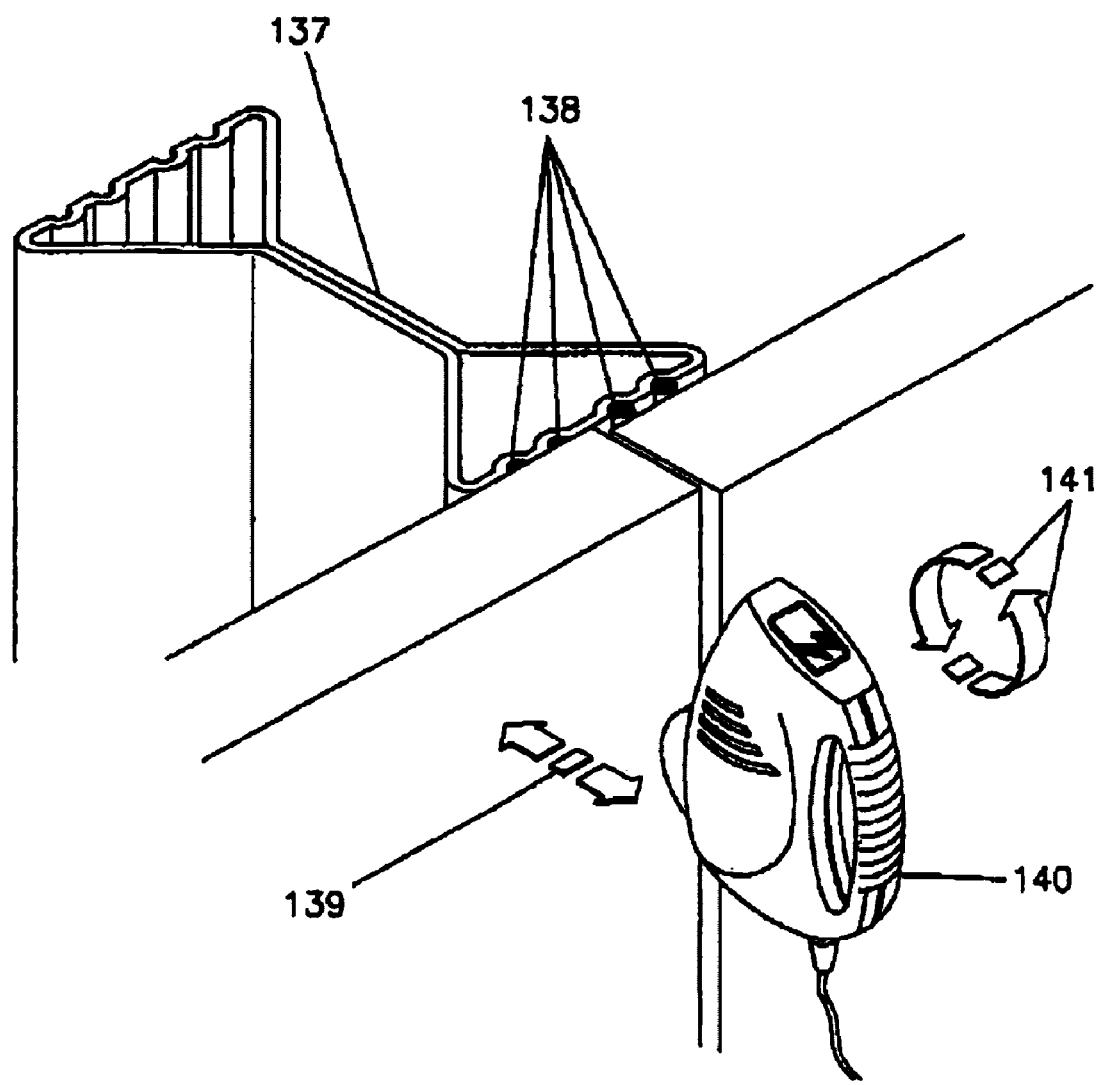
FIG. 45 illustrates the fixing of two panels (first element) to a stud (second element) by induction or RF heating.

In FIG. 45, dogbone stud 137, made of metal, and forming the first element, is shown together with the second elements, panels 5 and 5a. Beads of glue 138 are inserted in channels provided in dogbone stud 137. Glue 138 is a hot melt glue which is cured by RF heating. Until such cure takes place, dogbone stud 137 and panels 5 and 5a are maintained in place by a magnetic force, as indicated by arrow 139.

Heat sufficient to melt glue 138 is applied by apparatus 140 which includes a rotating heated wheel which rotates in the direction indicated by arrows 141. Once glue 138 has been cured, the magnetic attraction holding dogbone stud 137 to panels 5 and 5a can be released.

Figure 46:
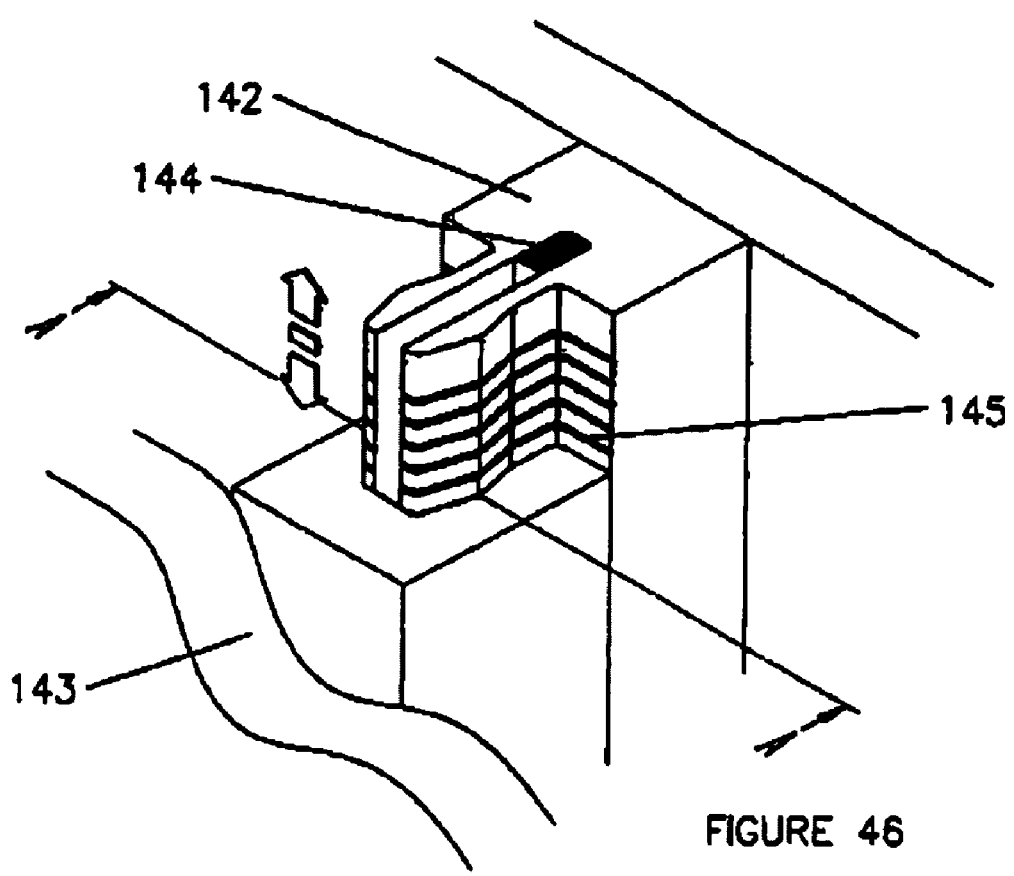
FIG. 46 shows a stud (first element) which can be fixed to a panel (second element) in accordance with the invention. This stud can be moved vertically to accommodate height variations.
Figure 47:
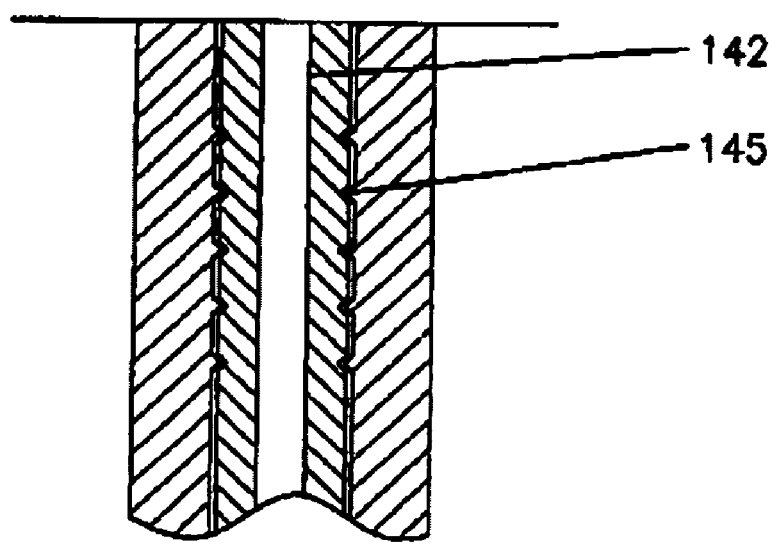
FIG. 47 is a sectional view of the stud of FIG. 46 taken along the lines A—A in FIG. 46.

In FIG. 46, foam stud 142 is provided in a length shorter than the vertical height of the wall panel 143 to be mounted. For example, foam stud 142 may be 2 metres long whereas wall panel 143 may be 2.3 metres high. A suitable locking means, activatable remotely, is indicated at 144. Lock 144 could be activated by magnetic means, for example. Stud 142 includes a number of adjustment ribs 145, the profile of which can be seen in the section in FIG. 47.

Figure 48:
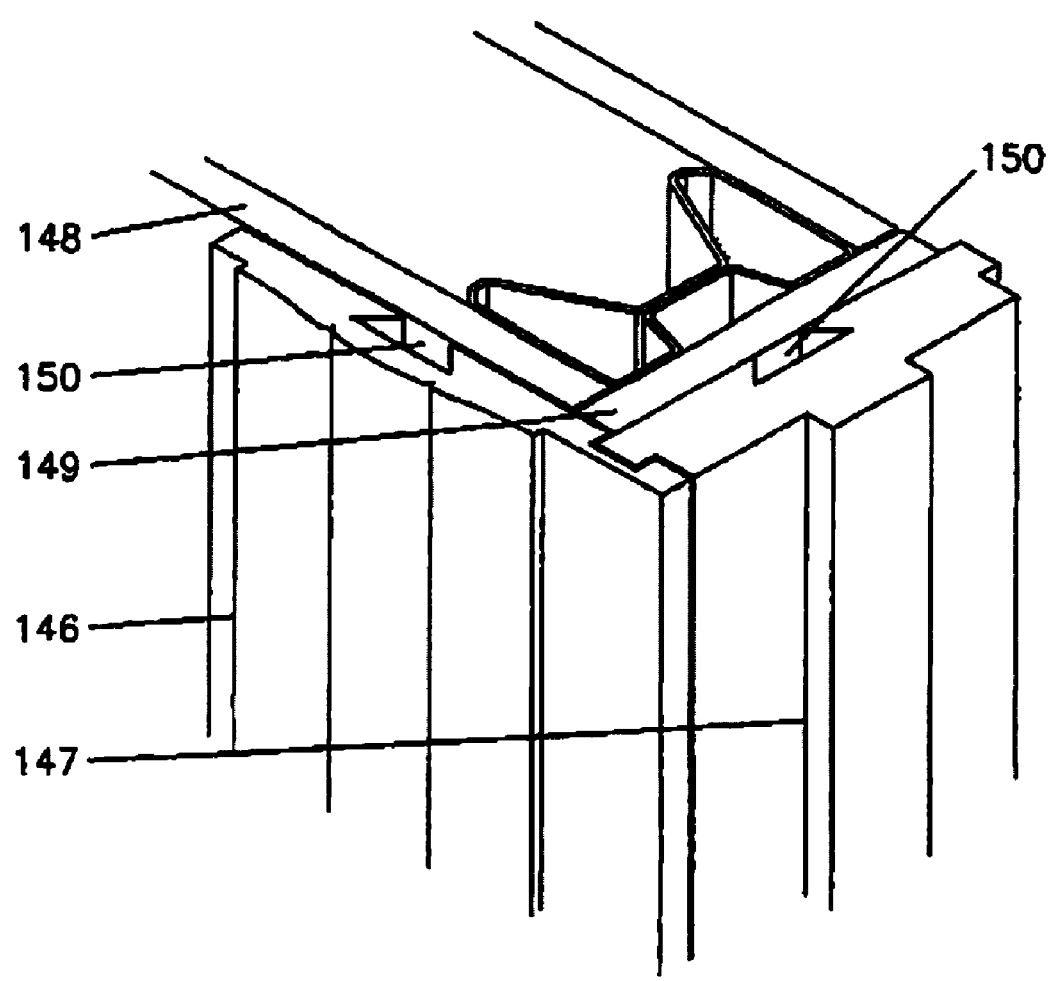
FIG. 48 shows in partial perspective view an architrave and a jamb, each joined to a panel according to the invention.
Figure 49:
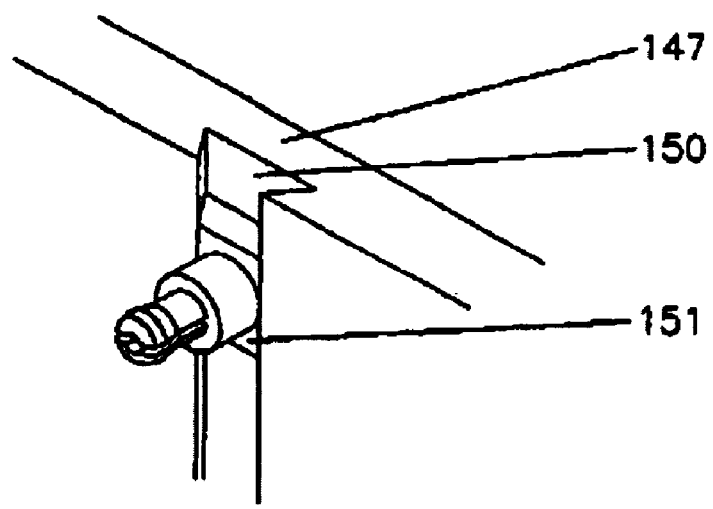
FIG. 49 shows in perspective view an embodiment of part of a connecting means of the purpose of fixing the architrave and the jamb in FIG. 48.

In FIG. 48, the method of the invention is shown in use, in this embodiment connecting a first element—an architrave 146 or a jamb 147, to a second element, panel 148 or 149 respectively. As can be seen from FIG. 48, architrave 146 and jamb 147 each incorporates a dovetail-shaped channel 150. This is for insertion of a connecting means 151 of the invention, as illustrated in FIG. 49. Connecting means 151 can operate the same as connecting means 109 in FIG. 40, for example.

It will be readily appreciated by one skilled in the art that cornices and other building elements may be substituted for the architrave 146 or the jamp 147 in FIG. 48.

Figure 51:
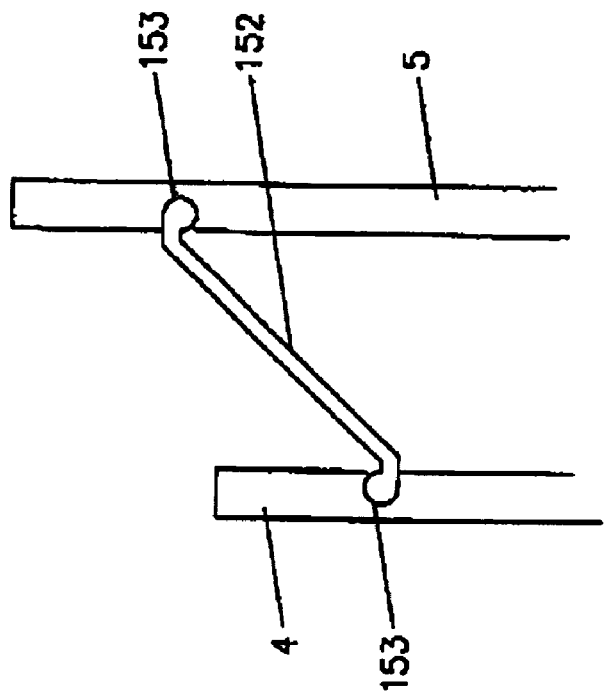
FIG. 51 is a detail of the joiners and elements of FIG. 50.
Figure 50:
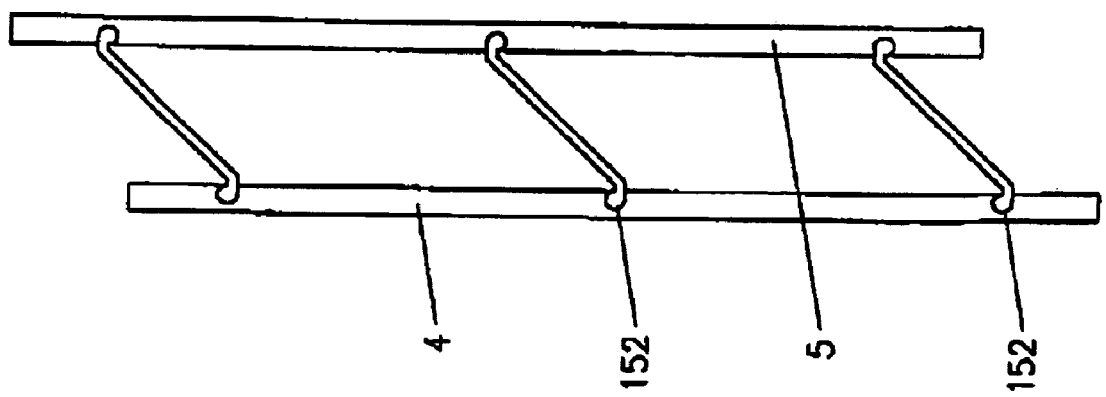
FIG. 50 shows a top plan view of a first element fixed to a second element by an elongated joiner, being the connecting means.

Turning now to FIGS. 50 and 51, first element 4 is joined to second element 5 by a plurality of elongated joiners 152.

As may be seen from the detail in FIG. 51, elongated joiner 152 has bulbous ends 153 which fit into complementary cavities in elements 4 and 5. Bulbous ends 153 can rotate in these cavities. Elements 4 and 5 may be assembled with elongated joiners 152 in the positions shown in FIG. 50 and 51, so that cabling or other material may be inserted between elements 4 and 5. Once that insertion has been completed, activation of remote means (not shown) can cause joiners 152 to collapse, or to rotate via their bublous ends 153, bringing elements 4 and 5 together or bringing one of the elements towards the other, thus permitting the cabling or other material to lie between elements 4 and 5, while still minimising the gap between elements 4 and 5.

Figure 52:
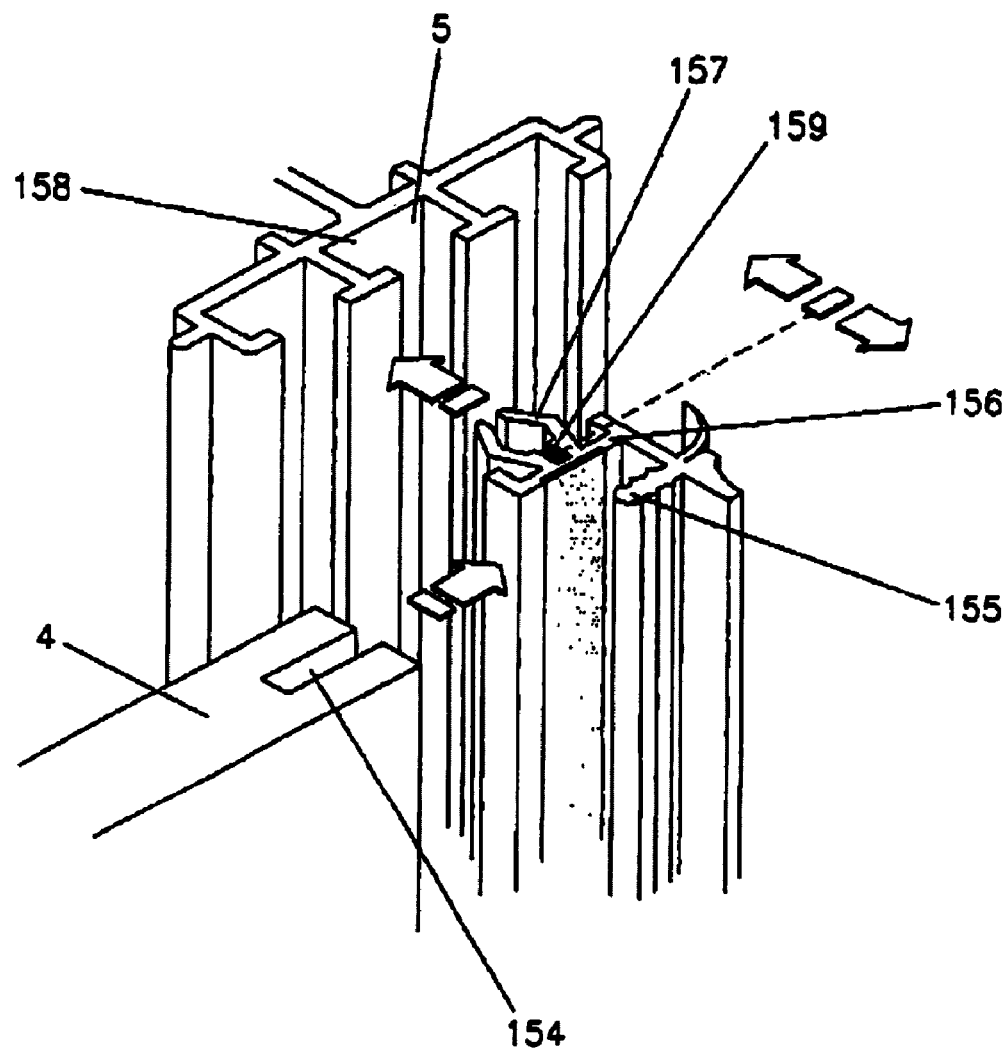
FIG. 52 shows the fixing of a first element, being a panel, to a second element, being a stud, via a connecting means, being a clip. This figure also illustrates the "on board technology" concept in relation to the panel.

In FIG. 52, panel 4 includes edge groove 154, which is an example of "on board technology". Into groove 154 is fitted extrusion 155 on connecting clip 156, which comprises an embodiment of connecting means according to the invention, to fix panel 4 to stud 5. Clip 156 has extruded arms 157 which snap fit into channel 158 of stud 5. Locking pin 159 in clip 156 may be activated after arms 157 have snapped into channel 158, so as to retain arms 157 in channel 158 until such time as release is required. Activation may be by magnetic or other suitable means.

Figure 53:
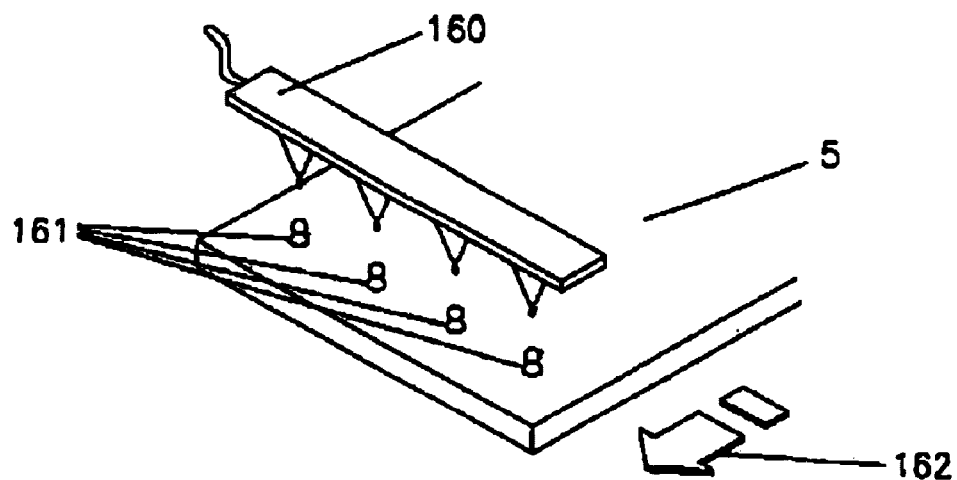
FIG. 53 shows a step in a method of manufacturing an element being a panel having "on board technology". In this embodiment, nodules are being formed on the face of the panel.

FIG. 53 shows an embodiment of manufacture of a panel with "on board technology", being a series of spaced nodules. This invention also includes within its scope a method of manufacture of such a panel. In the example shown, applicator 160 deposits small quantities of appropriate material 161 on a face of panel 5, as panel 5 travels in the direction of arrow 162.

Figure 54:
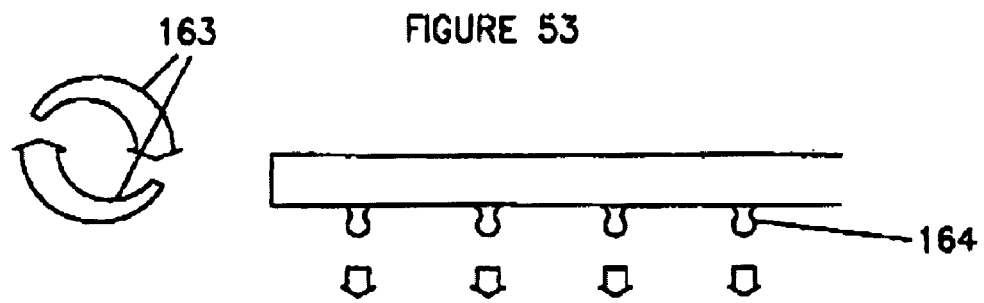
FIG. 54 shows a further step in the manufacture of the panel of FIG. 53, illustrating how the panel is flipped through 180° so that the nodules may form under the influence of gravity.
Figure 55:
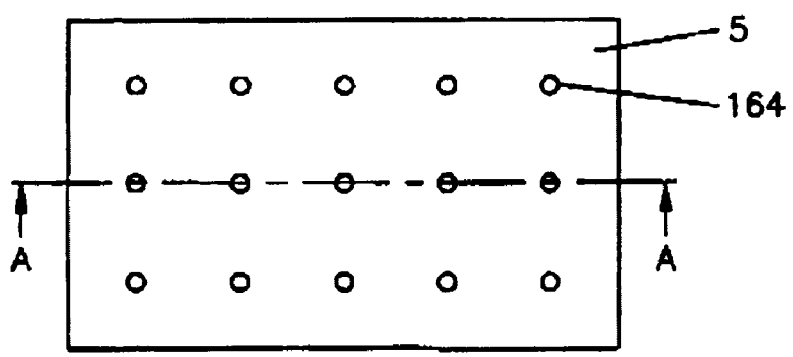
FIG. 55 shows in plan view the panel of FIG. 54 with the nodules formed.
Figure 56:
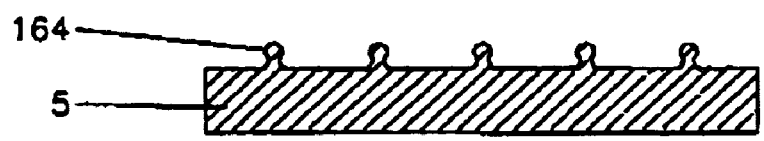
FIG. 56 is a sectional view of the panel of FIG. 55 taken along lines A—A in FIG. 55.

Panel 5 is then inverted as shown by arrows 163 (FIG. 54), so that material 161, owing to its qualities, develops into nodes 164, under the influence of gravity. These nodules may set without any further treatment, or may require curing, such as by heat. The finished product is shown in FIGS. 55 and 56.

Figure 57:
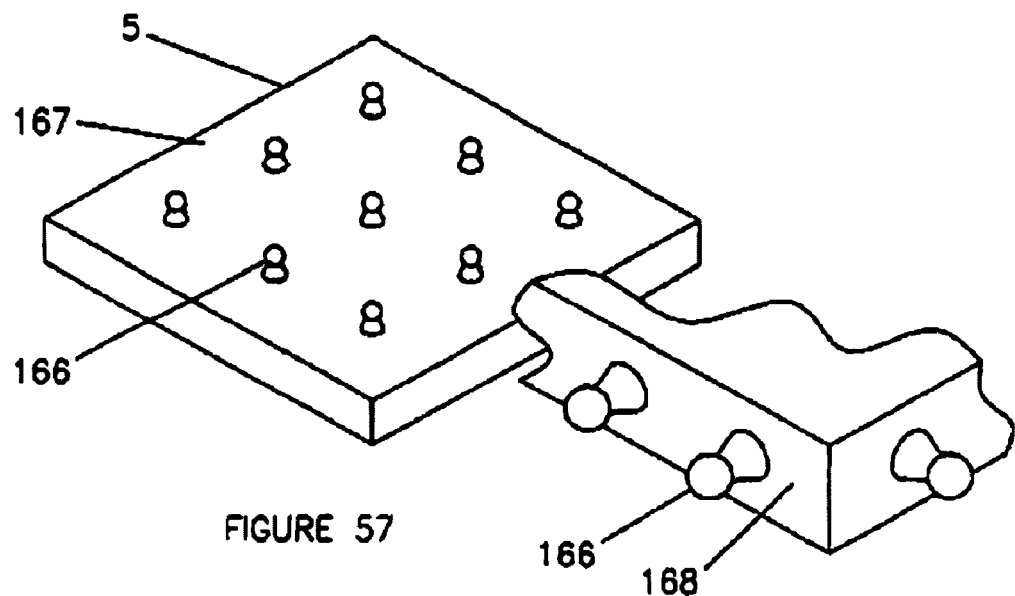
FIG. 57 shows in perspective view the panel of FIGS. 55 and 56. Superimposed on this is a second version of the panel where the nodules stand proud of two narrow faces (or edges) of the panel.
Figure 58:
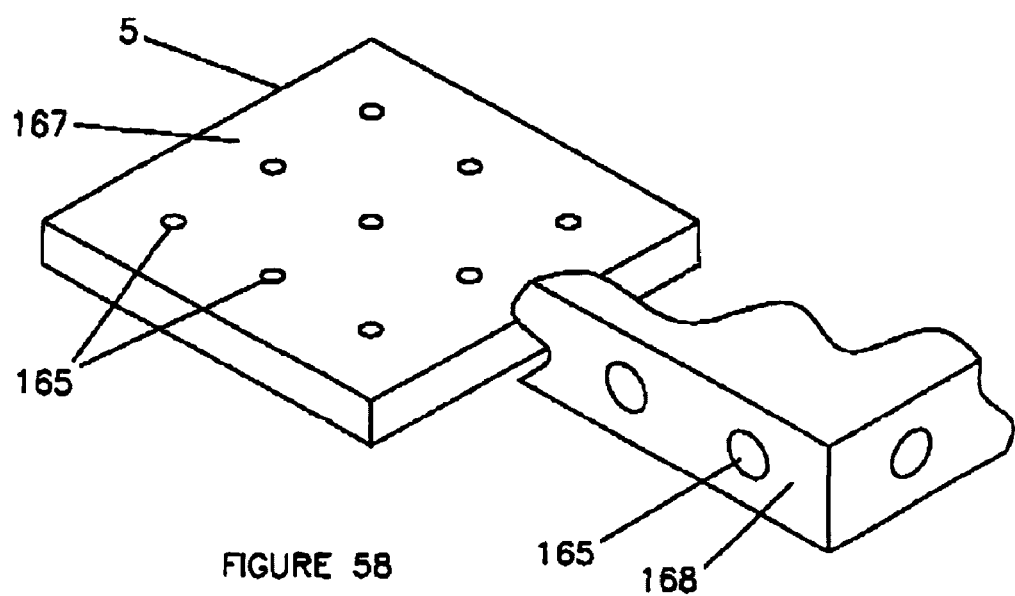
FIG. 58 shows another embodiment of "on board technology", in two versions, the first where there are recessed pits on the face of the panel and the second where there are recessed pits on the narrow faces or edges of the panel.

FIGS. 57 and 58 show how "on board technology" may be incorporated into panel 5, either on a face 167 or an edge 168 thereof, in the form of recessed pits 165 (FIG. 58) or proud nodes 166 (FIG. 57).

Figure 59:
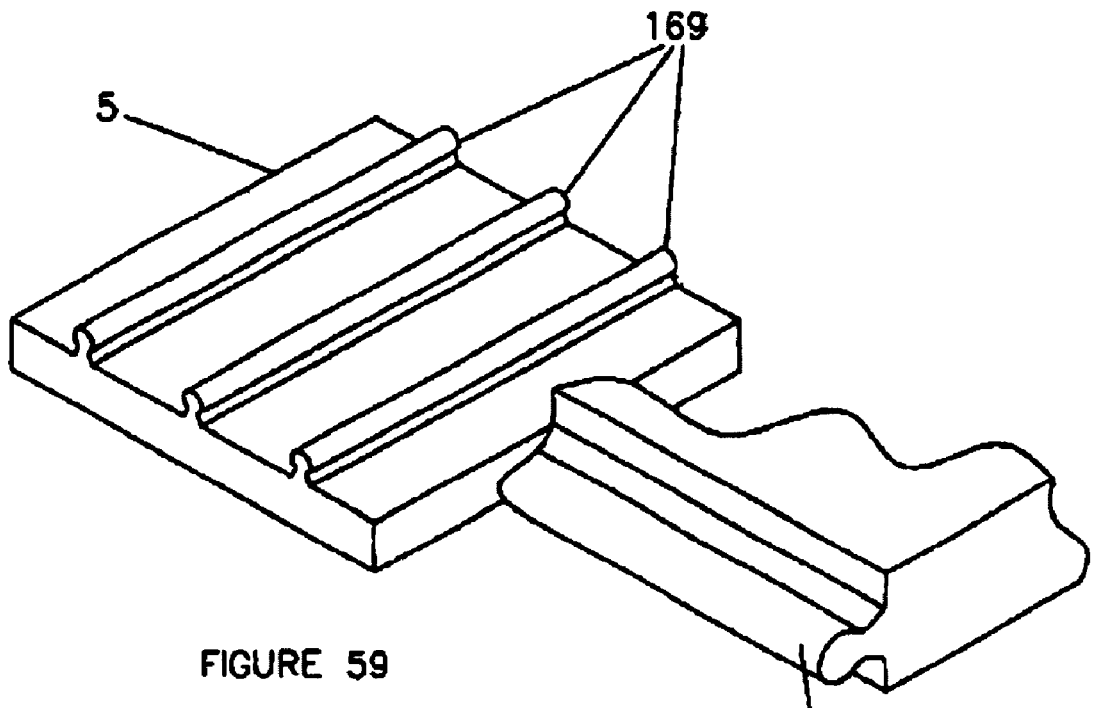
FIG. 59 shows two versions of further "on board technology", the first where there are ribs standing proud of the face of a panel and the second where there is a rib standing proud of the edge of the panel.
Figure 60:
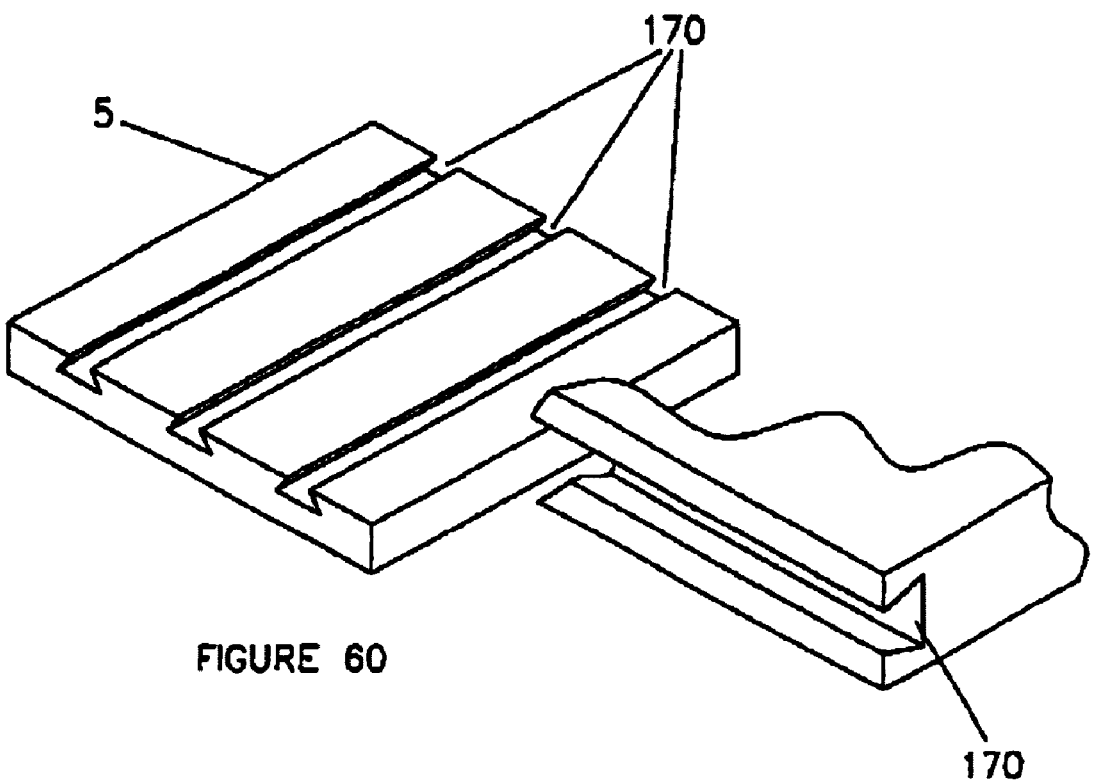
FIG. 60 shows two further versions of "on board technology" in relation to a panel, the first being recessed channels in the face of the panel and the second being a recessed channel along an edge of the panel.

Similarly, FIGS. 59 and 60 show how panel 5 can incorporate "on board technology", in the form of proud ribs 169 (FIG. 59) or recessed channels 170 (FIG. 60).

Figure 61:
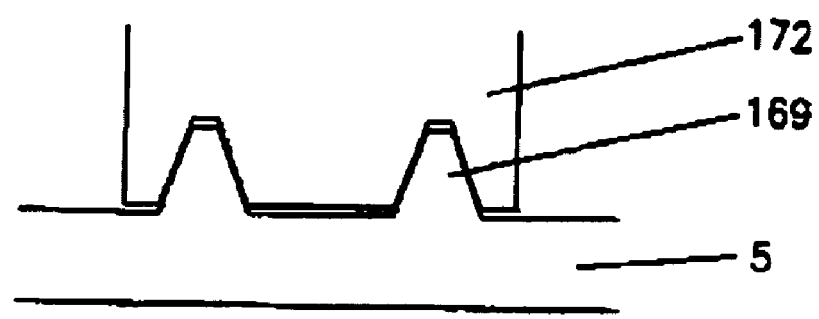
FIG. 61 shows a pressing detail being a step in the manufacture of a rib of the panel shown in FIG. 59.
Figure 62:
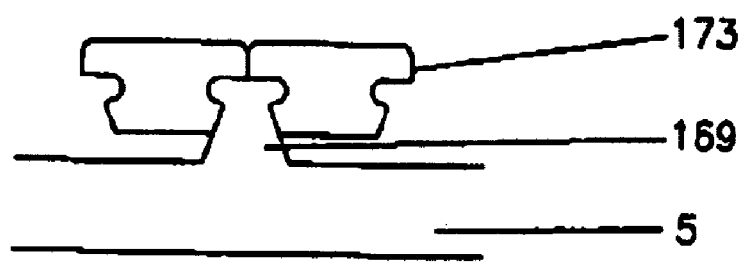
FIG. 62 shows an edging detail for the rib of FIG. 61.
Figure 63:
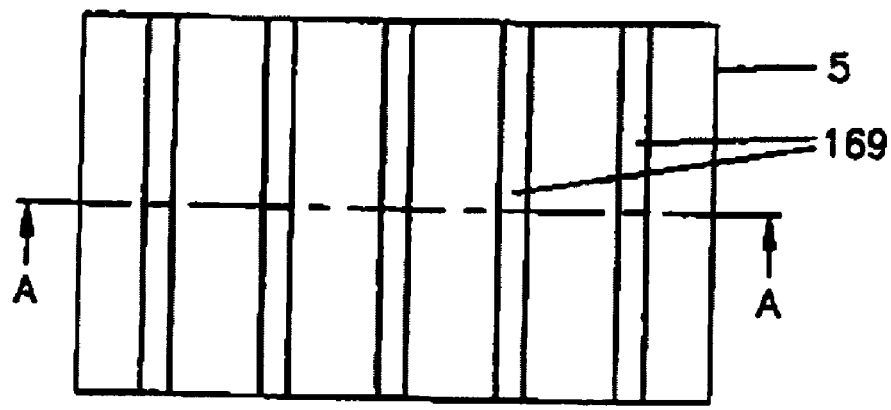
FIG. 63 illustrates in plan view a panel formed with the rib of FIG. 62 along its face.
Figure 64:
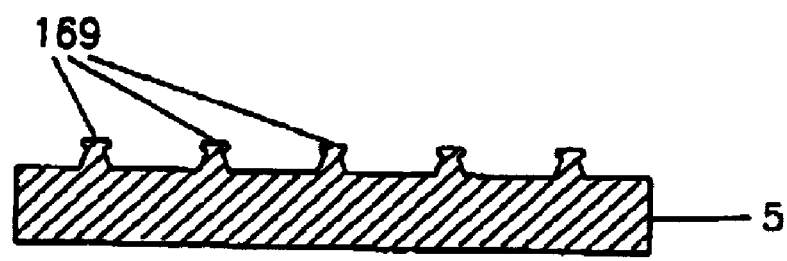
FIG. 64 is a sectional view of the panel of FIG. 63, taken along the lines A—A of FIG. 63.

The manufacture of ribs 169 on panel 5 is detailed in FIGS. 61 and 62, with a plan view shown in FIG. 63 and a sectional view shown in FIG. 64. First, ribs 169 are formed as shown in FIG. 61, using pressing means 172, with the locking portion 171 formed as shown in FIG. 62, using edging means 173. The finished product is shown in FIGS. 63 and 64.

INDUSTRIAL APPLICABILITY

As will be readily appreciated by those skilled in the various arts, the inventions disclosed herein are not limited to the examples set out and have wide applications in many areas. These inventions represent significant advances in the relevant arts.

The invention claimed is:

1. A connecting means adapted to releasably fix a first element and a second element, the connecting means comprising a locking means movable in a deformable channel by remote activation means between a locked position in which the first element is locked to the second element and an unlocked position in which the first element is released from the second element, wherein there is no physical contact between the connecting means and the remote activation means and wherein in the locked position the channel is substantially undeformed in the region of the locking means and the locking means prevents deformation of the channel in that region.

2. The connecting means of claim 1, wherein the locking means is a locking pin, the channel has a base and deformable sides, and the locking pin is adapted to be moved within the channel by the remote activation means towards or away from the base.

3. The connecting means of claim 1, wherein the locking means is rotatable between a locked position and an unlocked position.

4. The connecting means of claim 1, wherein the connecting means provides for adjustment of the first element relatively to the second element in one, two or three dimensions.

5. The connecting means of claim 1, wherein the connecting means provides for rotational adjustment of the first element relatively to the second element.

6. The connecting means of claim 1, wherein the remote activation means is adapted to move the locking means by the use of energy selected from the group consisting of magnetic force, electromagnetic force, electromagnetic induction, high frequency heating and radio waves.

7. The connecting means of claim 1, which further comprises signal means adapted to indicate whether the first element is locked to the second element.

8. The connecting means of claim 1, which further comprises signal means adapted to indicate whether the first element is released from the second element.

9. The connecting means of claim 1, which further comprises means for reporting damage or stress caused to the connecting means.

10. The connecting means of claim 1, which further comprises encryption.

11. The connecting means of claim 1 which includes first attachment means adapted to attach the connecting means to the first element.

12. The connecting means of claim 1, wherein the connecting means is capable of providing a report relating to one or more of the following:
   a) whether the first element is fixed to the second element;
   b) whether the first element is released from the second element;
   c) whether the connecting means has been damaged.

13. The connecting means of claim 1, wherein the locking means is a locking pin and the channel is tubular.

14. The connecting means of claim 1, which is a clip, a bolt or a strip connector.

15. The connecting means of claim 1, when attached to or inserted in the first or second element.

16. A plurality of connecting means of claim 1 when adapted to be fixed or released in a predetermined sequence.

17. The connecting means of claim 1, wherein the locking means is adapted to move in a linear path between the locked position and the unlocked position.

18. The connecting means of claim 1, wherein the first element and the second element form an assembly.

19. The connecting means of claim 2, wherein the locking pin, the sides of the channel and the base are of indefinite length.

20. The connecting means of claim 2, wherein there are two locking pins, each disposed in a channel with a base and deformable sides.

21. The connecting means of claim 2, wherein the channel has an external protrusion adapted to lock into a recess when in the locking position.

22. The connecting means of claim 19, wherein the connecting means is flexible.

23. A panel and connecting means combination, the connecting means being as claimed in claim 11, the panel representing the first element and having a pair of opposed faces and a plurality of edges, wherein the panel has second attachment means adapted to co-operate with the first attachment means to facilitate attachment of the panel with the connecting means.

24. The panel and connecting means combination of claim 23, wherein the first attachment means is a tongue and the second attachment means is a groove formed in an edge of the panel.

25. A method of releasably fixing a first element and a second element via a connecting means, the method comprising the step of applying remote activation means to fix the first element to the second element, the connecting means comprising a locking means movable in a deformable channel by remote activation means to a locked position in which the first element is fixed to the second element, wherein the locking means is movable by the or another remote activation means to an unlocked position in which the first element is released from the second element, there being no physical contact between the remote activation means and the connecting means and wherein in the locked position the channel is substantially undeformed in the region of the locking means and the locking means prevents deformation of the channel in that region.

26. The method of claim 25, wherein the first element is aligned with the second element before the remote activating means is applied to fix the first element to the second element.

27. The method of claim 25, wherein movement of the locking means to the locked position or to the unlocked position causes no mark on or damage to the first element or the second element.

28. The method of claim 25, wherein the first element is fixed to more than one second element.

29. The method of claim 25, wherein the second element is fixed to more than one first element.

30. The method of claim 25, wherein a plurality of first elements is fixed to a plurality of second elements.

31. The method of claim 25, wherein the connecting means includes a female connector attached to the first element and a male connector, adapted to cooperate with a female connector, attached to the second element.

32. The method of claim 25, which includes the subsequent step of applying the or another remote activation means to release the first element from the second element.

33. The method of claim 28, wherein the second elements are not identical.

34. The method of claim 29, wherein the first elements are not identical.

35. The assembly of claim 18, wherein the first element is selected from the group consisting of a plug for a power cable, glass, Perspex, an item of computer hardware, a telephone, an item of furniture, an electrical Applicances, a bicycle, an item of photographic equipment, a burglar alarm, an automotive accessory, trim, an automobile, a casing for a black box recording device, a frame, a billboard, an item of footwear excluding a sole, a boot, a dispenser, a carpet, a rug, a part of an item of luggage, an item of cladding, an item of decoration, a medicine cabinet, a gate, a door, a coin-operated machine, a tooth brace, a denture, a false tooth, a part of a dog collar, a mobile phone a tool, a computer, an item of street furniture, a building, and a pipe.

36. The assembly of claim 18, wherein the second element is selected from the group consisting of a power socket, a backing board, a cable, a wall, a floor, a ceiling, an item of furniture, a saddle bag, a tripod, a lens, a lens cap, a casing for a burglar alarm, an automobile, and automobile door, a bonnet, a boot lid, an access panel for a black box, a sound proofing panel, a billboard support, a sole for footwear, a ski, an access panel for a dispenser, a part of an item of luggage, a building, a door for a medicine cabinet, a gate, a door jamb, an access door for a coin-operated machine, a tooth, a jaw, a part of a dog collar, a battery, an access card, a tool bit, a computer peripheral, a street, a door, a window, and a pipe.

* * * * *